US011927806B2

(12) United States Patent
Kuo et al.

(10) Patent No.: US 11,927,806 B2
(45) Date of Patent: Mar. 12, 2024

(54) FIBER-TO-CHIP GRATING COUPLER FOR PHOTONIC CIRCUITS

(71) Applicant: TAIWAN SEMICONDUCTOR MANUFACTURING COMPANY, LTD., Hsin-Chu (TW)

(72) Inventors: Feng-Wei Kuo, Hsinchu County (TW); Lan-Chou Cho, Hsinchu (TW); Huan-Neng Chen, Taichung (TW); Chewn-Pu Jou, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 98 days.

(21) Appl. No.: 17/308,795

(22) Filed: May 5, 2021

(65) Prior Publication Data
US 2021/0255398 A1   Aug. 19, 2021

Related U.S. Application Data

(62) Division of application No. 16/417,437, filed on May 20, 2019, now Pat. No. 11,002,915.

(Continued)

(51) Int. Cl.
*G02B 6/34* (2006.01)
*G02B 6/30* (2006.01)

(52) U.S. Cl.
CPC .......... *G02B 6/34* (2013.01); *G02B 6/30* (2013.01)

(58) Field of Classification Search
CPC .......... G02B 6/34; G01M 11/33; G01M 11/38

(Continued)

(56) References Cited

U.S. PATENT DOCUMENTS 5,265,079 A * 11/1993 Getreuer .......... G11B 20/10009
  359/813
6,263,133 B1 * 7/2001 Hamm .................. G02B 6/32
  385/33

(Continued)

FOREIGN PATENT DOCUMENTS

WO    WO-0116635 A1 * 8/2001
WO    WO-2007005804 A2 * 11/2007

*Primary Examiner* — Kaveh C Kianni
(74) *Attorney, Agent, or Firm* — Duane Morris LLP

(57) ABSTRACT

Disclosed is a system and method for communication using an efficient fiber-to-chip grating coupler with a high coupling efficiency. In one embodiment, a method for communication, includes: transmitting optical signals between a semiconductor photonic die on a substrate and an optical fiber array attached to the substrate using at least one corresponding grating coupler on the semiconductor photonic die, wherein the at least one grating coupler each comprises a plurality of coupling gratings, a waveguide, a cladding layer, a first reflection layer and a second reflection layer, wherein the plurality of coupling gratings each comprises at least one step in a first lateral direction and extends in a second lateral direction, wherein the first and second lateral directions are parallel to a surface of the substrate and perpendicular to each other in a grating plane, wherein the first reflection layers are configured such that the plurality of coupling gratings is disposed between the first reflection layer and the cladding layer, wherein the second reflection layer are configured such that the cladding layer is disposed between the second reflection layer and the waveguide.

12 Claims, 16 Drawing Sheets

Related U.S. Application Data

(60) Provisional application No. 62/692,049, filed on Jun. 29, 2018.

(58) Field of Classification Search
USPC .................................................. 385/37
See application file for complete search history.

(56) References Cited

U.S. PATENT DOCUMENTS

| | | | | |
|---|---|---|---|---|
| 6,360,032 B1* | 3/2002 | Berger | ................... | G02B 6/266 |
| | | | | 385/20 |
| 6,687,010 B1* | 2/2004 | Horii | ................... | G01B 9/0205 |
| | | | | 356/479 |
| 6,773,170 B1* | 8/2004 | Georgiev | ............. | G02B 6/4226 |
| | | | | 403/57 |
| 6,921,215 B2* | 7/2005 | Catchmark | ............. | G02B 6/32 |
| | | | | 385/92 |
| 8,691,584 B2* | 4/2014 | Durack | ............. | G01N 15/1468 |
| | | | | 436/63 |
| 9,746,608 B1* | 8/2017 | Rabiei | ................... | G03F 7/0005 |
| 10,444,593 B2* | 10/2019 | Mekis | ................... | G02F 1/2257 |
| 10,591,802 B2* | 3/2020 | Sun | ................... | G02F 1/2955 |
| 2002/0141467 A1* | 10/2002 | Iwai | ................... | B82Y 20/00 |
| | | | | 372/45.01 |
| 2002/0176463 A1* | 11/2002 | Bullington | ............. | H01S 5/187 |
| | | | | 438/22 |
| 2002/0192850 A1* | 12/2002 | Stoltz | ................... | G02B 6/124 |
| | | | | 438/22 |
| 2003/0174419 A1* | 9/2003 | Kindler | ................ | G02B 6/3652 |
| | | | | 359/819 |
| 2004/0156589 A1* | 8/2004 | Gunn, III | ............ | G02B 6/12004 |
| | | | | 385/37 |
| 2005/0053113 A1* | 3/2005 | Clary | ................... | G02B 27/62 |
| | | | | 359/705 |
| 2005/0112541 A1* | 5/2005 | Durack | ................... | G01N 33/48 |
| | | | | 435/40.5 |
| 2006/0239605 A1* | 10/2006 | Palen | ................... | G02B 6/423 |
| | | | | 385/33 |
| 2010/0111473 A1* | 5/2010 | Pinguet | ................... | G02B 6/34 |
| | | | | 385/37 |
| 2010/0119229 A1* | 5/2010 | Roelkens | ........... | G02B 6/12007 |
| | | | | 398/79 |
| 2011/0038588 A1* | 2/2011 | Kim | ................... | G02B 6/124 |
| | | | | 385/131 |
| 2013/0182998 A1* | 7/2013 | Andry | ................... | G02B 6/4204 |
| | | | | 385/33 |
| 2014/0142436 A1* | 5/2014 | Hutchins | ................ | A61B 5/0066 |
| | | | | 600/478 |
| 2014/0193115 A1* | 7/2014 | Popovic | ................ | G02B 6/124 |
| | | | | 385/14 |
| 2015/0063745 A1* | 3/2015 | Lin | ................... | H01L 23/60 |
| | | | | 385/14 |
| 2015/0219842 A1* | 8/2015 | Sqalli | ................ | B29D 11/00692 |
| | | | | 264/1.24 |
| 2016/0062063 A1* | 3/2016 | Ogura | ................... | G02B 6/305 |
| | | | | 264/1.27 |
| 2016/0109659 A1* | 4/2016 | Jiang | ................... | H01L 31/167 |
| | | | | 438/24 |
| 2017/0031110 A1* | 2/2017 | Bhagavatula | ........ | G02B 6/3863 |
| 2017/0102503 A1* | 4/2017 | Israel | ................... | G02B 6/3692 |
| 2017/0115458 A1* | 4/2017 | Mekis | ................... | G02B 6/4208 |
| 2017/0207600 A1* | 7/2017 | Klamkin | ................ | H01S 5/141 |
| 2018/0031791 A1* | 2/2018 | Israel | ................... | G02B 6/4206 |
| 2018/0059297 A1* | 3/2018 | Peroz | ................... | H04N 9/3102 |
| 2018/0074264 A1* | 3/2018 | Tokushima | ............. | G02B 6/30 |
| 2018/0231732 A1* | 8/2018 | Paquet | ................ | G02B 6/305 |
| 2018/0364425 A1* | 12/2018 | Nanjo | ................ | G02B 6/3839 |
| 2020/0069225 A1* | 3/2020 | Vizbaras | ................ | G01J 3/10 |

* cited by examiner

US 11,927,806 B2

FIBER-TO-CHIP GRATING COUPLER FOR PHOTONIC CIRCUITS

RELATED APPLICATION

This application is a division of U.S. patent application Ser. No. 16/417,437, filed May 20, 2019, which claims the benefit of and priority to U.S. Patent Provisional Application No. 62/692,049, filed on Jun. 29, 2018, the contents of each are incorporated herein in their entireties.

BACKGROUND

Optical gratings are frequently used to enable communication between light sources and other components (e.g., photodetectors). For example, optical gratings can be used to redirect light from an optical fiber into an optical detector. Light coupled from one end of the optical gratings that has been traveling transversely through the optical gratings by reflecting off the inner surfaces at shallow angles may be redirected so that it strikes the inner surfaces at a sharper angle that is greater than the critical angle of incidence, thus allowing the redirected light to escape from the other end of the optical gratings. After escaping, the light may impinge upon a detector. The detected light may then be used for various purposes, such as to receive an encoded communications signal that was transmitted through the optical gratings. Unfortunately, this process, as well as a reverse process in which optical gratings are used to redirect light from an on-chip light source to an optical fiber, may exhibit poor coupling efficiency, with a large part of the redirected light not reaching the detector. There exists a need to develop a method and apparatus of efficient optical coupling using optical gratings.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

The coupling efficiency is the ratio of power that couples from the waveguide mode to the fiber mode (or vice versa) and can be calculated using $CE=(1-R)\eta_d\eta_{ov}$, wherein $\eta_d$ is the directionality, $\eta_{ov}$ is the optical field overlap, and R is the back reflection. Directionality $\eta_d$ measures a fraction of power that are diffracted upward. The optical field overlap $\eta_{ov}$ measures the overlap integral between the diffracted field profile and the Gaussian fiber mode, and the back reflection R measures a fraction of power reflected back into the input port. Therefore, in order to improve the coupling efficiency, one can improve the directionality, increase the overlap and use small refractive index contrast to reduce the back reflection. This disclosure presents various embodiments of an efficient fiber-to-chip grating coupler with high coupling efficiency.

Figure 1:
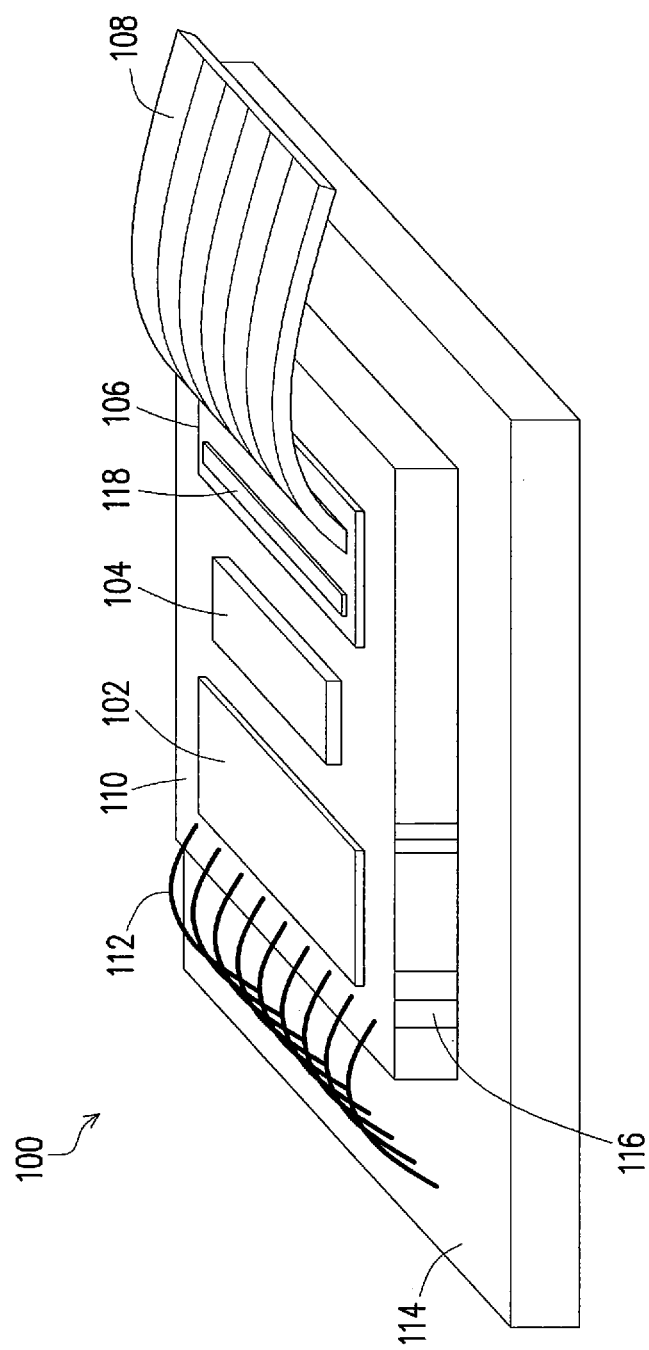
FIG. 1 illustrates an exemplary block diagram of a device, in accordance with some embodiments of present disclosure, in accordance with various embodiments of present disclosure.

FIG. 1 illustrates an exemplary block diagram of a device 100, in accordance with some embodiments of present disclosure. It is noted that the device 100 is merely an example, and is not intended to limit the present disclosure. Accordingly, it is understood that additional functional blocks may be provided in or coupled to the device 100 of FIG. 1, and that some other functional blocks may only be briefly described herein.

Referring to FIG. 1, the device 100 comprises an electronic die 102, a light source die 104, a photonic die 106, an interposer 110 and a printed circuit board (PCB) substrate 114. The electronic die 102, light source die 104 and the photonic die 106 are coupled together through input/output interfaces (not shown) on the interposer 110. In some embodiments, the interposer 110 is fabricated using silicon. In some embodiments, the interposer 110 comprises at least one of the following: interconnecting routing, through silicon via (TSV), and contact pads. In some embodiments, the interposer 110 is to integrate all components including the electronic die 102, the light source die 104, and the photonic die 106 together. In certain embodiments, each of the dies 102/104/106 are coupled to the interposer 110 using a flip-chip (C4) interconnection method. In some embodiments, high density solder microbumps are used to couple the dies 102/104/106 to the interposer 110. Further, the interposer 110 is coupled to the PCB substrate 114 through wire bonding 112 or through silicon-vias (TSV) 116 using soldering balls. The TSVs 116 can comprise electrically conductive paths that extend vertically through the interposer 110 and provide electrical connectivity between the electronic die 102 and the PCB 114. In some embodiments, the PCB substrate 114 can comprises a support structure for the device 100, and can comprise both insulating and conductive material for isolation devices as well as providing electrical contact for active devices on the photonic die 106 as well as circuits/devices on the electronic die 102 via the interposer 110. Further, the PCB substrate 114 can provide a thermally conductive path to carry away heat generated by devices and circuits in the electronic die 102 and the light source die 104.

In some embodiments, the electronic die 102 comprises circuits (not shown) including amplifiers, control circuit, digital processing circuit, etc. The electronic die 102 further comprises at least one electronic circuit (not shown) that provides the required electronic function of the device 100 and driver circuits for controlling the light source 104 or elements in the photonic die 106.

In some embodiments, the light source die 104 comprises a plurality of components (not shown), such as at least one light emitting elements (e.g., a laser or a light-emitting diode), transmission elements, modulation elements, signal processing elements, switching circuits, amplifier, input/output coupler, and light sensing/detection circuits. In some embodiments, each of the at least one light-emitting elements in the light source die 104 can comprise solid-state inorganic, organic or a combination of inorganic/organic hybrid semiconducting materials to generate light. In some embodiments, the light source die 104 is on the photonic die 106.

In some embodiments, the photonic die 106 comprises an optical fiber array 108, an optical interface and a plurality of fiber-to-chip grating couplers 118. In some embodiments, the plurality of fiber-to-chip grating coupler 118 is configured to couple the light source 106 and the optical fiber array 108. In some embodiments, the optical fiber array 108 comprises a plurality of optical fibers and each of them can be a single-mode or a multi-mode optical fiber. In some embodiments, the optical fiber array 108 can be epoxied on the photonic die 106.

In some embodiments, the photonic die 106 further comprises components (not shown) such as a laser driver, digital control circuit, photodetectors, waveguides, small form-factor pluggable (SFP) transceiver, High-speed phase modulator (HSPM), calibration circuit, distributed Mach-Zehnder Interferometer (MZI), grating couplers, light sources, (i.e., laser), etc. Each of the plurality of fiber-to-chip grating coupler 118 enables the coupling of optical signals between the optical fiber array 108 and the light source die 102 or corresponding photodetectors on the photonic die 106. The plurality of fiber-to-chip grating couplers 118 each comprise a plurality of gratings and a waveguide with designs to reduce refractive index contrast to reduce back reflection losses providing improved coupling efficiency between the optical fiber on the corresponding waveguide, which are discussed in details below in various embodiments of the present disclosure.

During operation, optical signals received from a remote server attached on one end of the optical fiber array 108 can be coupled through the fiber-to-chip grating couplers 118 attached to the other end of the optical fiber array 108 to the corresponding photodetectors on the photonic die 106. Alternatively, optical signals received from the light source die 104 can be coupled through the fiber-to-chip grating couplers 118 to the optical fiber array 108 which can be further transmitted to the remote server.

Figure 2A:
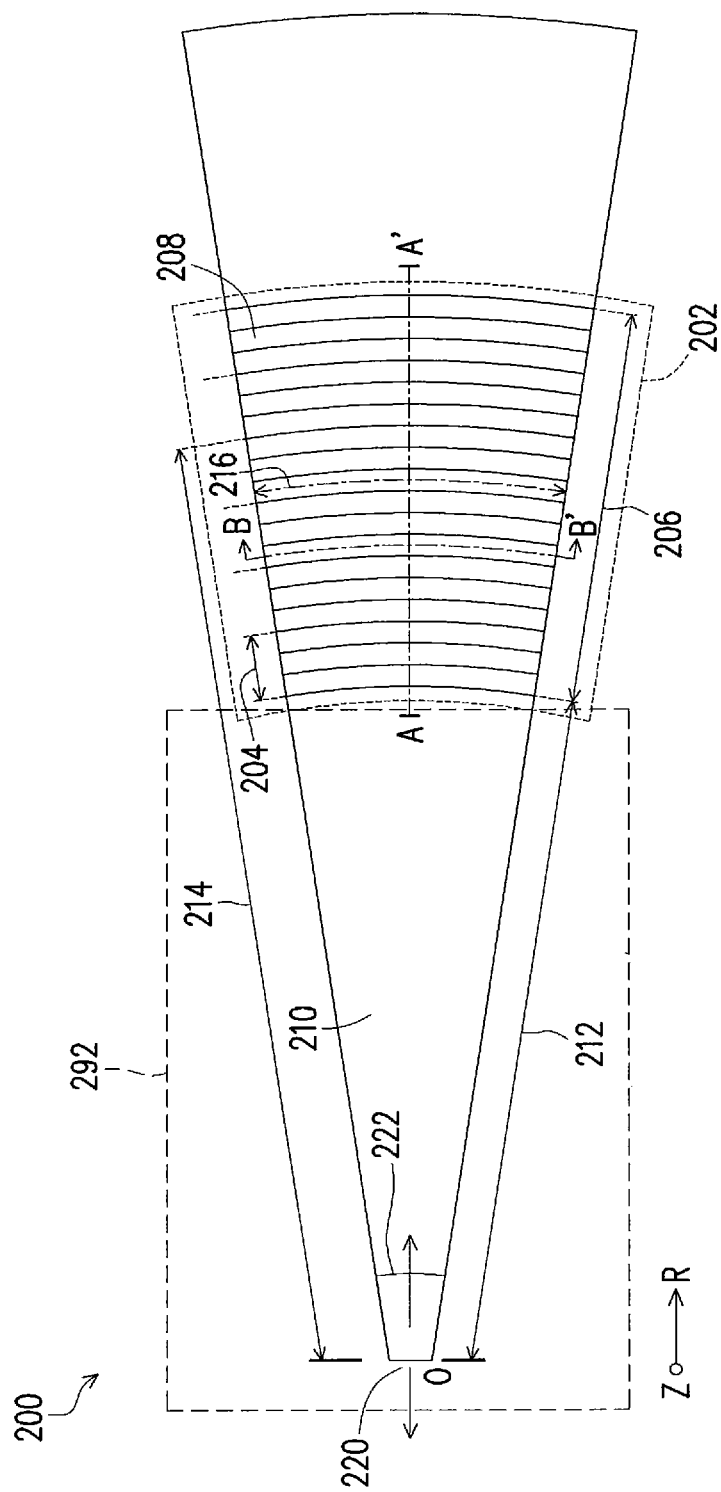
FIG. 2A illustrates a top view of an exemplary fiber-to-chip grating coupler, in accordance with some embodiments of the present disclosure.
Figure 10:
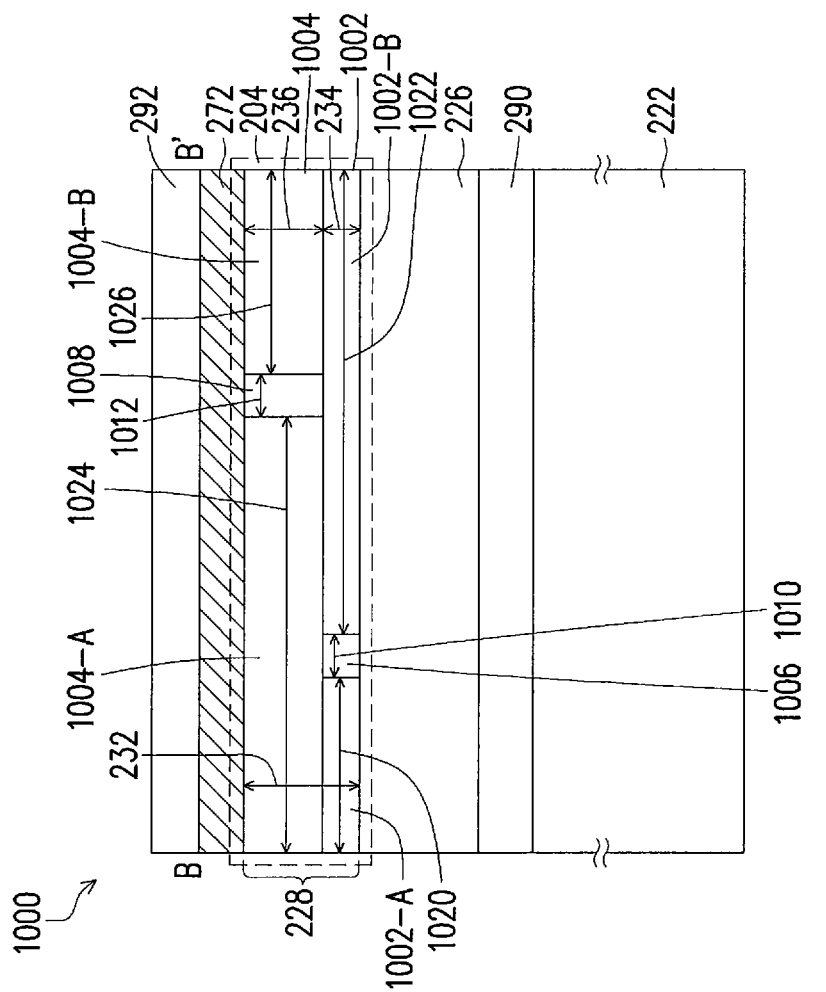
FIG. 10 illustrates a cross-sectional view of an exemplary fiber-to-chip grating coupler along the B-B' direction in FIG. 2A, in accordance with some embodiments of the present disclosure.

FIG. 2A illustrates a top view of an exemplary fiber-to-chip grating coupler 200, in accordance with some embodiments of the present disclosure. In some embodiments, the fiber-to-chip grating coupler (hereinafter "grating coupler") 200 comprises a grating region 202 and a waveguide 210. The grating region 202 comprises a plurality of periodic gratings 204. In the illustrated embodiments, curved lines are edges 208 of a plurality of gratings 204 in the grating coupler 200. In some embodiments, each grating 204 in a grating period has 3 edges 208 (i.e., 19 black curves for 6 gratings 204 in the grating region 202). This is, of course, merely an example and is not intended to be limiting. Any numbers of edges 208 in each grating 204 and any numbers of gratings 204 in a grating coupler 200 can be used and are within the scope of this invention, which are discussed in further detail below (FIG. 10).

In the illustrated embodiment, the grating coupler 200 scatters incident optical field 220 received from a waveguide 210 in a direction perpendicular to the gratings 204 along the radius direction, the refractive index contrast between that of the waveguide 210 and the grating region 202 causes strong scattering out of the gratings 204. The plurality of periodic gratings 204 in the grating region 202 produces an exponentially decaying intensity profile along the propagation direction along the radius direction at a given angle 222 relative to one end of the grating coupler 200. The exponentially decaying intensity profile determines a position of an optical fiber (not shown) in the optical fiber array 108 on top of the grating coupler 200 so as to efficiently couple the optical field from the chip to the optical fiber. In some embodiments, the number of periodic gratings 204 can be determined according to the shape, geometry and materials of the gratings, as well as a desired operational wavelength range, which are discussed in details below.

Referring to FIG. 2A, the grating region 202 and the waveguide 210 comprise a length 206 and 212 in the radius direction, respectively. In some embodiments, the plurality of gratings 204 each comprises a radius of curvature 214 according to its position to the center "0" and an arc length 216. In some embodiments, each of the plurality of gratings 204 in the grating coupler 200 does not have a curvature, i.e., gratings are straight and have a same length 216.

Figure 2B:
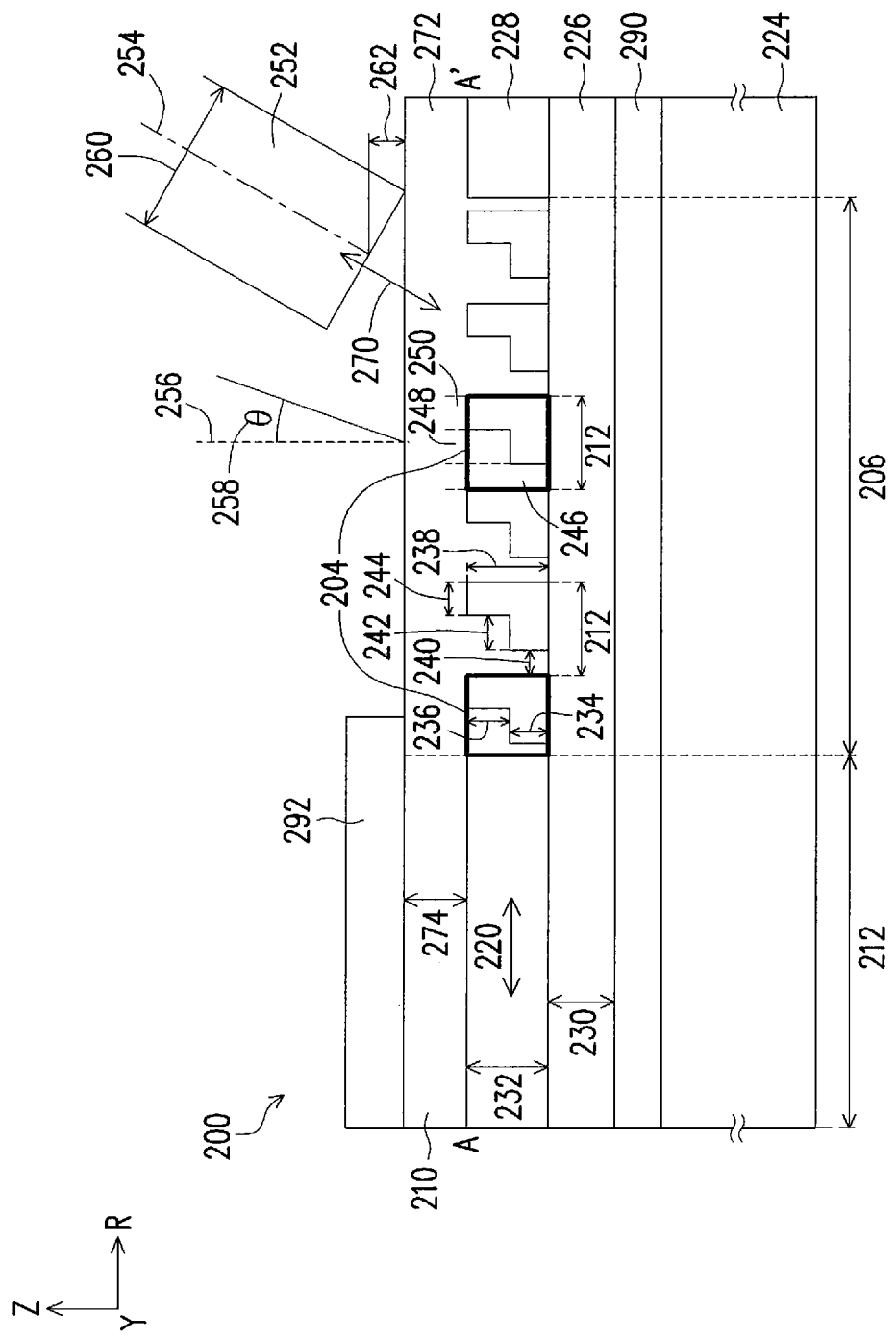
FIG. 2B illustrates a cross-sectional view of an exemplary grating coupler along the radius direction (A-A') in FIG. 2A, in accordance with some embodiments of the present disclosure.

FIG. 2B illustrates a cross-sectional view of an exemplary grating coupler 200 along the radius direction (A-A') in FIG. 2A, in accordance with some embodiments of the present disclosure. In the illustrated embodiments, the grating coupler 200 fabricated on a silicon substrate 224 comprises a multi-layered structure comprising a bottom reflection layer 290, a silicon oxide layer 226, a silicon layer 228, and a top reflection layer 292.

In the illustrated embodiment, the silicon oxide layer 226 is fabricated on the silicon substrate 224 using chemical vapor deposition, physical vapor deposition, and etc. In some embodiments, the silicon oxide layer 226 has a thickness of 500-3000 nanometers. In some embodiments, this layer can be replaced by other types of dielectric materials, such as Si, Si3N4, SiO2 (e.g., quartz, and glass), Al2O3, and H2O, according to the application.

In some embodiments, the silicon layer 228 is deposited on the silicon oxide layer 226 is deposited using chemical vapor deposition. In some embodiments, the silicon layer 228 has a thickness of 270 nanometers. In some other embodiments, the silicon layer 228 has a thickness in a range of 250-350 nanometers according to the application.

In some embodiments, the bottom reflection layer 290 comprises at least one of the following: Al, Cu, Ni, and a combination. In some embodiments, the bottom reflection layer 290 has a thickness in a range of 0.1-10 micrometers. In some embodiments, the top reflection layer 292 comprises at least one of the following: Al, Cu, Ni and a combination. In some embodiments, the top reflection layer 292 has a thickness in a range of 0.1-10 micrometers. In some embodiments, the top reflection layer 292 only covers the waveguide 210. In some embodiments, the top reflection layer 292 is equal to or greater than 20×20 micron.

In some embodiments, the waveguide 210 comprises the same material used in the plurality of gratings 204. In some other embodiments, the waveguides 210 comprises a second material that is different from the material used in the plurality of gratings 204.

In the illustrated embodiments, the plurality of gratings 204 each comprising a two-etch-step L-shaped sidewall profile is used to achieve a low back-reflection and a high directionality. In some embodiments, side walls of each steps are perpendicular to the substrate surface (i.e., top surface of the silicon oxide layer 226). In the illustrate embodiment, each of the plurality of gratings 204 comprises a full-etch trench 246, a shallow-etch trench 248, and a pillar 250 in the silicon layer 228. In some embodiments, the full-etch trench 246 has a trench width of 240 and a trench depth 238. In some embodiments, the trench depth 238 of the full etch trench 246 equals to the thickness 232 of the silicon layer 228. In some embodiments, the trench width 240 and depth 238 equal to 50 nanometers and 270 nanometers. In some other embodiments, the trench width 240 of the full etch trench 246 is in the range of 70-270 nanometers according to the application with different operational wavelengths. In some embodiments, the shallow etch trench 248 has a trench width 242 and a trench depth 236. In some embodiments, the trench depth 236 and the trench width 242 equal to 130 nanometers and 230 nanometers. In some other embodiments, the trench depth 236 and the trench width 242 of the shallow trench 248 are in a range of 70-270 nanometers and 100-200 nanometer, according to the application with different operational wavelengths. In some embodiments, the pillar 250 has a pillar height 238 and a pillar width 244. In some embodiments, the pillar height 238 and the pillar width 244 both equal to 270 nanometers. In some other embodiments, the pillar height 238 and the pillar width 244 of the pillar 250 are in a range of 180-400 nanometers and 170-370 nanometers. In the illustrated embodiments, the shallow-etch trench 248 is located between the full-etch trench 246 and the pillar 250 in one period 212. In some embodiments, a grating region 202 has a length of 206 and a waveguide 210 has a length of 212 in the radius direction.

In some embodiments, the grating coupler 200 is further covered with a cladding layer 272. In some embodiments, the cladding layer 272 comprises silicon oxide and has a thickness of 274 from its top surface to the top surface of the underneath unpatterned silicon layer 228. In some embodiments, the cladding layer 272 has a thickness of 2 micrometers. In some embodiments, the thickness 274 of the cladding layer 272 can be in a range of 0.6-3 micrometers according to the application. In some embodiments, the cladding layer 272 can comprise other types of dielectric materials according to different applications, including polycrystalline silicon and silicon nitride. In some other embodiments, the cladding layer 272 comprises a plurality of layers with graded indices (i.e., the refractive index of the layers in the cladding layer 272 increases). In some embodiments, the thickness of the plurality of layers can be individually adjusted according to the application. It should be noted that this is merely an example and optimized thickness of the cladding layer 272 is a function of its effective index (i.e., material properties) in combination with the grading structure underneath. Therefore, any thickness of the cladding layer 272 can be used to achieve optimized coupling efficiency at desired wavelengths and are within the scope of the present disclosure.

In some embodiments, the radiated optical field 270 from the grating coupler 200 with an electric field normal to the plane of incidence (i.e., transverse-electric TE polarized) is collected by an optical fiber 252 with a core diameter 260. In some embodiments, the core of the optical fiber 252 is located at a distance 262 from the center of its core to the top surface of the cladding layer 272. In some embodiments, the optical fiber 252 receives the optical field 270 at an angle 258 (between an axis 254 of the optical fiber 252 and the y-axis 256 perpendicular to the surface of the substrate). In some embodiments, the angle 258 is 13.3 degree. In some other embodiments, the angle 258 of the optical fiber 252 can be configured in a range of 5-15 degree according to the structural/geometric/materials properties of the grating coupler 200 and the cladding layer 272. In some embodiments, the optical fiber 252 can be a single mode fiber or a multimode fiber.

Figure 2C:
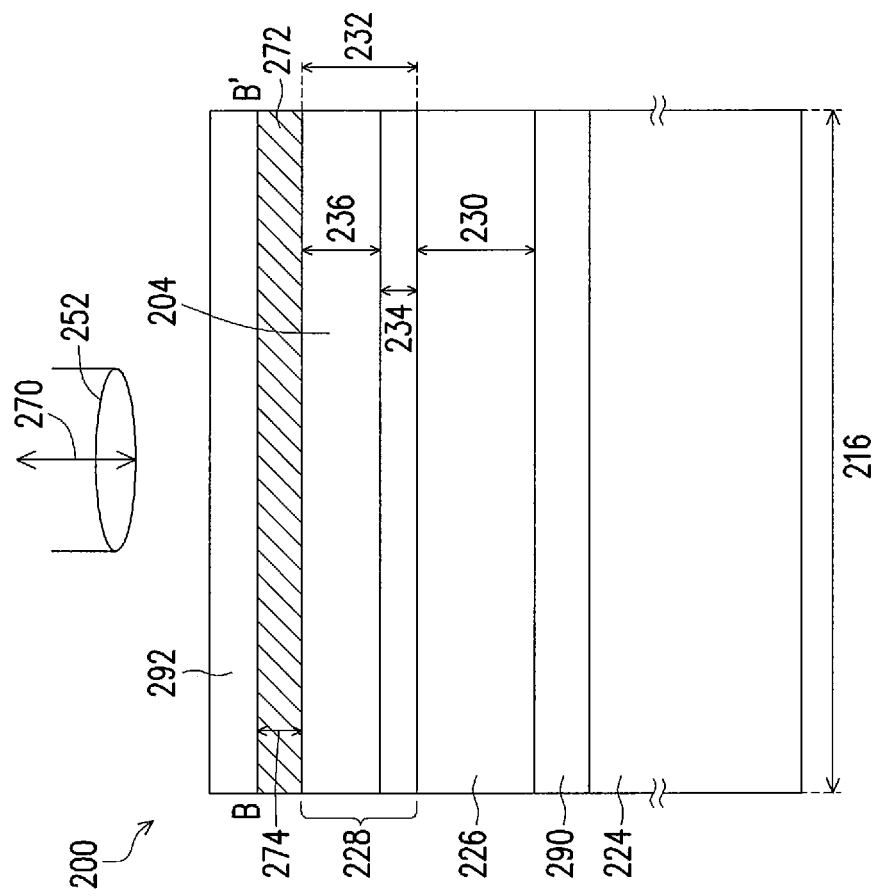
FIG. 2C illustrates a cross-sectional view of an exemplary fiber-to chip grating coupler along the B-B' direction as shown in FIG. 2A, in accordance with some embodiments of the present disclosure.

FIG. 2C illustrates a cross-sectional view of an exemplary fiber-to chip grating coupler 200 along the B-B' direction as shown in FIG. 2A, in accordance with some embodiments of the present disclosure. An L-shaped grating 204 in a silicon layer 228 with its cross-sectional view 200 shown in FIG. 2B is continuous throughout a length 216. In the illustrated embodiments, the L-shaped grating 204 comprises 2 etch steps and each of the two steps have a step height 234 and 236, respectively. In some embodiments, a thickness 232 of the silicon layer 228 equals to the summation of the step heights 234 and 236. In some embodiments, the thickness 232 of the silicon layer 228 is 270 nanometers. In some other embodiments, the thickness 232 of the silicon layer can be in a range of 180-400 nanometers.

Figure 3:
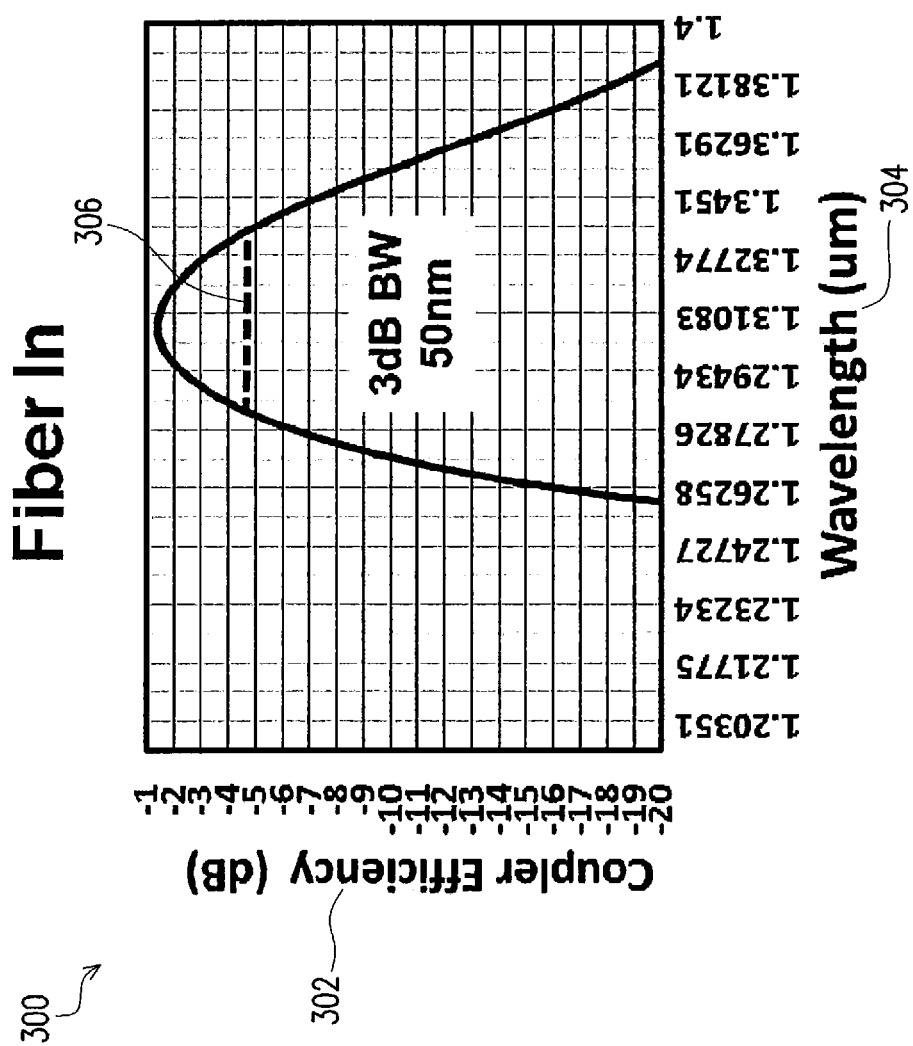
FIG. 3 illustrates a plot showing a simulated coupling efficiency (CE) as a function of wavelength (λ) for an optical field out of a grating coupler to an optical fiber shown in FIGS. 2A-2C, in accordance with some embodiments of the present disclosure.
Figure 4:
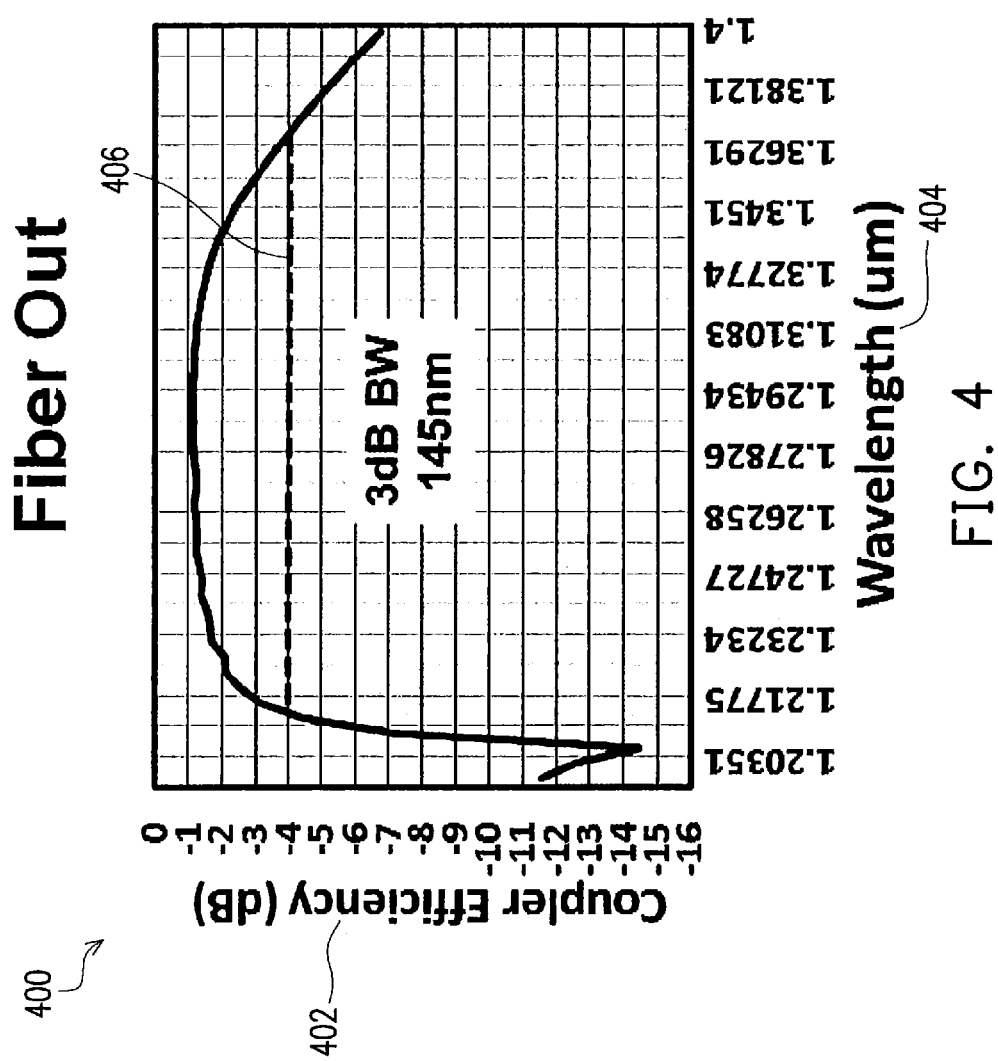
FIG. 4 illustrates a plot showing a simulated coupling efficiency (CE) as a function of wavelength (λ) for an optical field into a grating coupler from an optical fiber shown in FIGS. 2A-2C, in accordance with some embodiments of the present disclosure.

FIG. 3 illustrates a plot 300 showing a simulated coupling efficiency (CE) 302 as a function of wavelength (λ) 304 for an optical field out of a grating coupler 200 to an optical fiber shown in FIGS. 2A-2C, in accordance with some embodiments of the present disclosure. The grating coupler 200 used in the simulation is fabricated on a SOI wafer with a thickness 230 of a silicon oxide layer 226 of 2 micrometers and a thickness 232 of a silicon layer 228 of 270 nanometers. The grating coupler 200 comprises a waveguide region 210 with a length 212 of 25 micrometers an angle 222 of 45 degrees. The grating coupler 200 further comprises a grating region 202 with a length 206 of 100 micrometers. The gratings 204 in the grating region 202 have a period of 550 nanometers. Each of the gratings 204 comprises a full-etch trench 246, a shallow-etch trench 248 and a pillar 250. The full-etch trench 246 has a first trench depth of 270 nanometers and a first trench width of 50 nanometers; the shallow-etch trench 248 has a second trench depth 130 nanometers and a second trench width 230 nanometers; and the pillar 250 has a pillar height of 270 nanometers and a pillar width of 270 nanometers. The gratings 204 are covered by a silicon oxide cladding layer 272 with a thickness 274 of 2 µm. The grating coupler 200 receives an optical field 270 from an optical fiber 252 located at 10 micrometers from the top surface of the silicon oxide cladding layer 272. Further the optical fiber 252 is located above the sixth grating 204 starting from the waveguide region 210. A single wavelength and TE-polarized incident optical field with a wavelength of 1310 nanometers is provided to the waveguide 220. Wavelength-dependent refractive index of materials including air, silicon, silicon oxide are obtained from SOI, CMOS metal materials, and used in the simulation. Further, in the simulation, a top reflection layer using materials (e.g., Cu) with a thickness of 1 micrometer and a bottom reflection layer using materials (e.g., Cu) with a thickness of 1 micrometer are used. The simulated coupling efficiency 302 is −1.33 dB (73.6%) at a center wavelength 304 of 1310 nanometers and a bandwidth 306 of the grating coupler 200 is 50 nanometers, when the optical field is traveling out of the grating coupler 200 to the optical fiber FIG. 4 illustrates a plot 400 showing a simulated coupling efficiency (CE) 402 as a function of wavelength (λ) 404 for an optical field into a grating coupler 200 from an optical fiber shown in FIGS. 2A-2C, in accordance with some embodiments of the present disclosure. The grating coupler 200 used in the simulation is fabricated on a SOI wafer with a thickness 230 of a silicon oxide layer 226 of 2 micrometers and a thickness 232 of a silicon layer 228 of 270 nanometers. The grating coupler 200 comprises a waveguide region 210 with a length 212 of 25 micrometer, an angle 222 of 45 degrees. The grating coupler 200 further comprises a grating region 202 with a length 206 of 100 micrometers. The gratings 204 in the grating region 202 have a period of 550 nanometers. Each of the gratings 204 comprises a full-etch trench 246, a shallow-etch trench 248 and a pillar 250. The full-etch trench 246 has a first trench depth of 270 nanometers and a first trench width of 50 nanometers; the shallow-etch trench 248 has a second trench depth 130 nanometers and a second trench width 230 nanometers; and the pillar 250 has a pillar height of 270 nanometers and a pillar width of 270 nanometers. The gratings 204 are covered by a silicon oxide cladding layer 272 with a thickness 274 of 2 µm. The grating coupler 200 receives an optical field 270 from an optical fiber 252 located at 10 micrometers from the top surface of the silicon oxide cladding layer 272. Further the optical fiber 252 is located above the sixth grating 204 starting from the waveguide region 210. A single wavelength and TE-polarized incident optical field with a wavelength of 1310 nanometers is provided to the waveguide 220. Wavelength-dependent refractive index of materials including air, silicon, silicon oxide are obtained from SOI, CMOS metal materials, and used in the simulation. Further, in the simulation, a top reflection layer using materials (e.g., Cu) with a thickness of 1 micrometer and a bottom reflection layer using material (e.g., Cu) with a thickness of 1 micrometer are used. The simulated coupling efficiency 402 is −1 dB (79.4%) at a center wavelength 404 of 1280 nanometers and a bandwidth 406 is 145 nanometers, when the optical field travels into the grating coupler 200 from the optical fiber.

Figure 5:
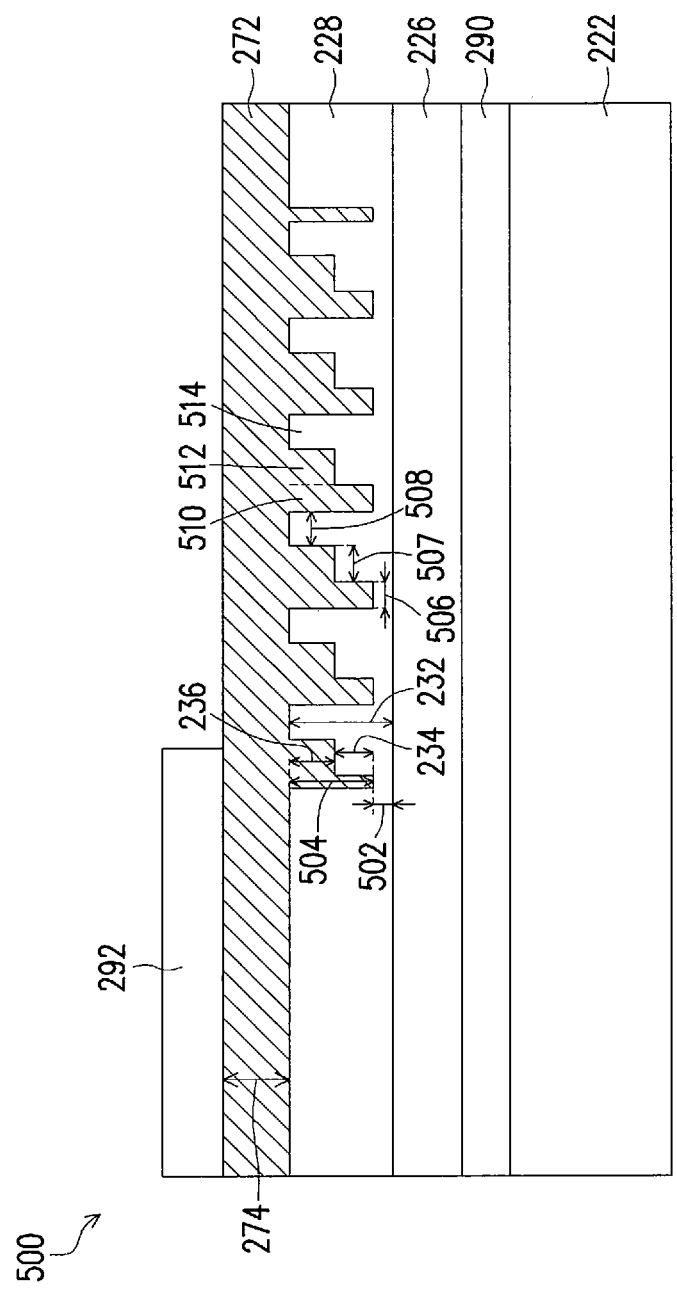
FIG. 5 illustrates a cross-sectional view of an exemplary fiber-to-chip grating coupler along a radius direction, in accordance with some embodiments of the present disclosure.

FIG. 5 illustrates a cross-sectional view of an exemplary fiber-to-chip grating coupler 500 along a radius direction, in accordance with some embodiments of the present disclosure. This is, of course, merely an example and is not intended to be limiting. Any numbers of gratings 204 in a grating coupler 500 can be used and are within the scope of this invention. In the illustrated embodiments, the plurality of gratings 204 in the fiber-to-chip grating coupler 500 are identical in the cross-sectional view and may have different arc lengths 506 as shown in FIG. 2A. In the illustrated embodiments, each of the plurality of gratings 204 comprises a deep-etch trench 510, a shallow-etch trench 512, and a pillar 514. In some embodiments, the deep-etch trench 510 has a trench depth 504 and a trench width 506. In some embodiments, the trench depth 504 is smaller than the thickness 234 of the silicon layer 228. In some embodiments, the thickness 234 of the silicon layer 228 is 270 nanometers.

Figure 6:
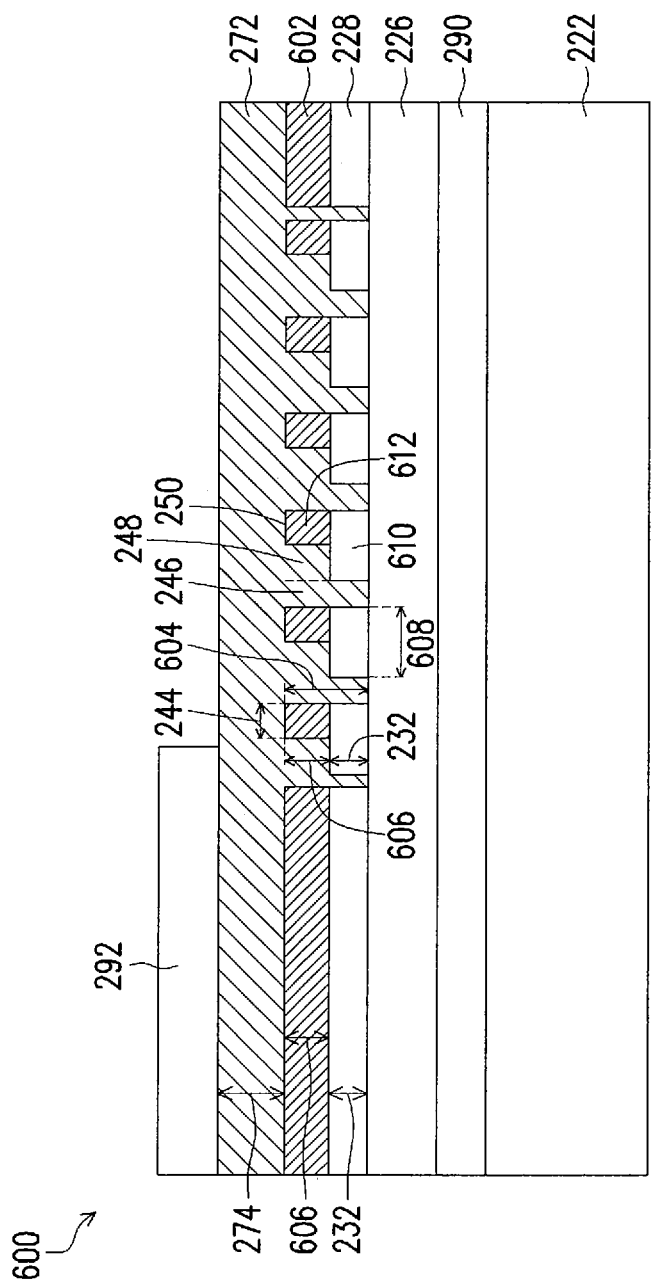
FIG. 6 illustrates a cross-sectional view of an exemplary fiber-to-chip grating coupler along a radius direction, in accordance with some embodiments of the present disclosure.

FIG. 6 illustrates a cross-sectional view of an exemplary fiber-to-chip grating coupler 600 along a radius direction, in accordance with some embodiments of the present disclosure. This is, of course, merely an example and is not intended to be limiting. Any numbers of gratings 204 in a grating coupler 600 can be used and are within the scope of this invention. In the illustrated embodiments, the plurality of gratings 204 in the fiber-to-chip grating coupler 600 are identical in the cross-sectional view and may have different arc lengths 206 as shown in FIG. 2A. In the illustrated embodiment, each of the plurality of gratings 204 comprises a full-etch trench 246, a shallow-etch trench 248 and a pillar 250. In some embodiments, each of the plurality of gratings 204 comprises a first block 610 and a second block 612, wherein the first block 610 are etched in the silicon layer 228 and the second block 610 are etched in a coating layer 602 on top of silicon layer 228. In some embodiments, the coating layer 602 comprises at least one material that is different from the silicon layer 228. In some embodiments, the coating layer 602 has a thickness 606. In some embodiments, the first block 610 has a width 608 and the second block 612 has a width 244. In some embodiments, dimensions and materials properties of the blocks 610 are used to further reduce the reflection.

Figure 7:
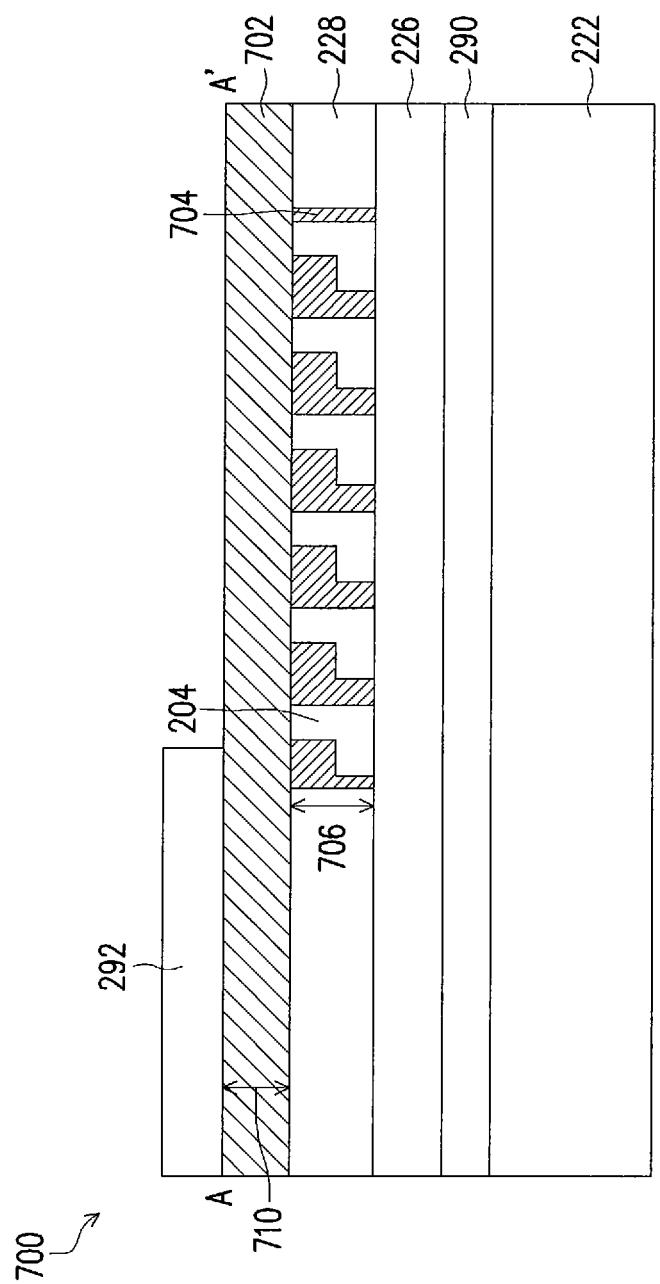
FIG. 7 illustrates a cross-sectional view of an exemplary fiber-to-chip grating coupler along a radius direction, in accordance with some embodiments of the present disclosure.

FIG. 7 illustrates a cross-sectional view of an exemplary fiber-to-chip grating coupler 700 along a radius direction, in accordance with some embodiments of the present disclosure. This is, of course, merely an example and is not intended to be limiting. Any numbers of gratings 204 in a grating coupler 700 can be used and are within the scope of this invention. In the illustrated embodiments, the plurality of gratings 204 in the fiber-to-chip grating coupler 700 are identical in the cross-sectional view and may have different arc lengths 206 as shown in FIG. 2A. In the illustrated embodiments, each of the plurality of gratings 204 comprises a full-etch trench 246, a shallow-etch trench 248 and a pillar 250. The full-etch trench 246 and the shallow-etch trench 248 are filled with a first cladding layer 704. In some embodiments, the first cladding layer 704 has a top surface that is coplanar with the top surface of a silicon layer 228 after CMP polishing. In some other embodiments, the top surface of the first cladding layer 704 can be at a level that is higher or lower than the surface of the silicon layer 228. In the illustrated embodiments, a second cladding layer 702 is deposited on the top surface of the silicon layer 228 and the first cladding layer 704. The second cladding layer has a thickness 710 from its top surface to the top surface of the silicon layer 228. In some embodiments, the first cladding layer 704 comprises materials that are different from materials in the second cladding layer 702.

Figure 8:
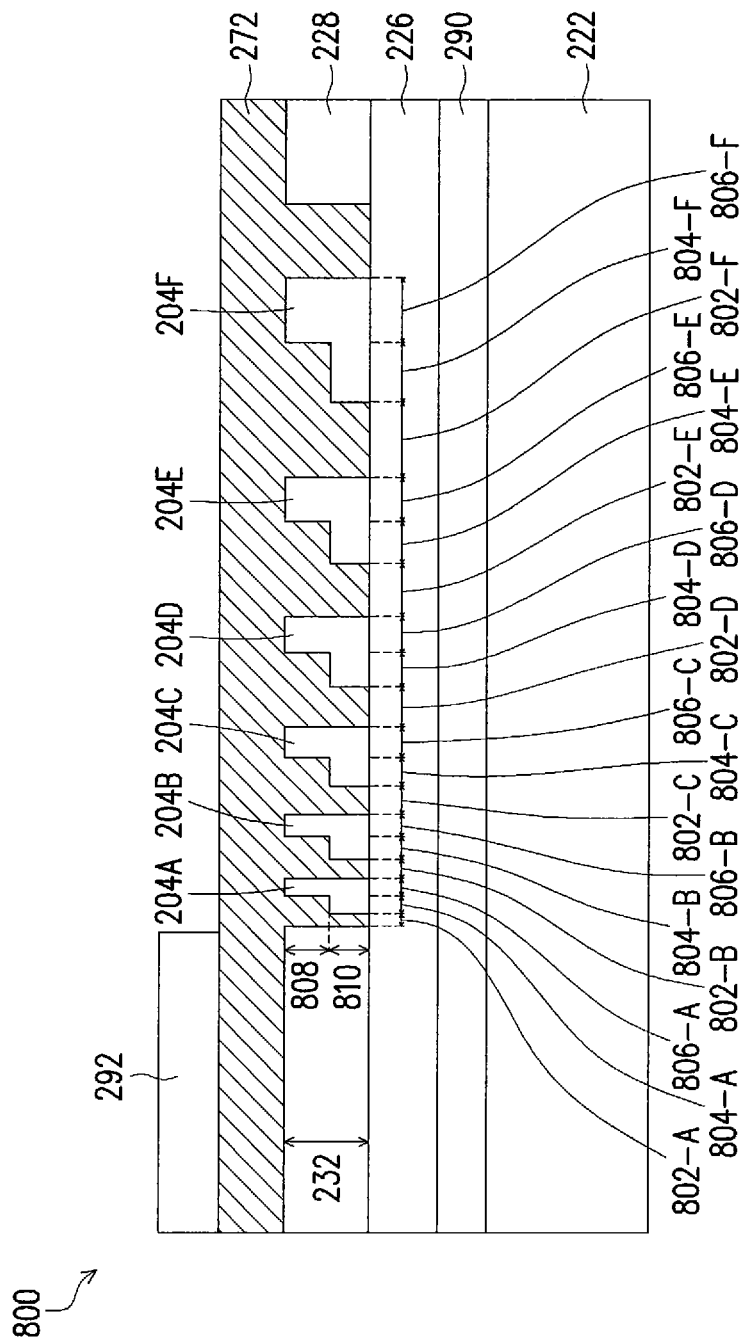
FIG. 8 illustrates a cross-sectional view of an exemplary fiber-to-chip grating coupler along the radius direction, in accordance with some embodiments of the present disclosure.

FIG. 8 illustrates a cross-sectional view of an exemplary fiber-to-chip grating coupler 800 along the radius direction, in accordance with some embodiments of the present disclosure. This is, of course, merely an example and is not intended to be limiting. Any numbers of gratings 204 in a grating coupler 800 can be used and are within the scope of this invention. In the illustrated embodiments, each of the plurality of gratings 204 comprises a full-etch trench 246, a shallow-etch trench 248 and a pillar 250. In the illustrated embodiments, the plurality of gratings 204 in the fiber-to-chip grating coupler 800 are different in dimension and may also have different lengths 206 as shown in FIG. 2A. In the illustrated embodiments, the plurality of gratings 204 have the same step heights 808 and 810. For example, in the illustrated embodiment, a first grating 204-A comprises a first full-etch trench with a first full-etch trench width 802-A, a first shallow-etch trench with a first shallow-etch trench width 804-B, and a first pillar has a first pillar width 806-A; a second grating 204-B comprises a second full-etch trench with a second full-etch trench width 802-B, a second shallow-etch trench with a second shallow-etch trench width 804-B, and a second pillar has a second pillar width 806-B; a third grating 204-C comprises a third full-etch trench with a third full-etch trench width 802-C, a third shallow-etch trench with a third shallow-etch trench width 804-C, and a third pillar has a third pillar width 806-C; a fourth grating 204-D comprises a fourth full-etch trench with a fourth full-etch trench width 802-D, a fourth shallow-etch trench with a fourth shallow-etch trench width 804-D, and a fourth pillar has a fourth pillar width 806-D; a fifth grating 204-E comprises a fifth full-etch trench with a fifth full-etch trench width 802-E, a fifth shallow-etch trench with a fifth shallow-etch trench width 804-E, and a fifth pillar has a fifth pillar width 806-E; and a sixth grating 204-F comprises a sixth full-etch trench with a sixth full-etch trench width 802-F, a sixth shallow-etch trench with a sixth shallow-etch trench width 804-F, and a sixth pillar has a sixth pillar width 806-F.

In the illustrated embodiments, the sixth pillar width is greater than the fifth pillar width; the fifth pillar width is greater than the fourth pillar width; the fourth pillar width is greater than the third pillar width; the third pillar width is greater than the second pillar width; and the second pillar width is greater than the first pillar width. Further, the sixth shallow-etch trench width is greater than the fifth shallow-etch trench width; the fifth shallow-etch trench width is greater than the fourth shallow-etch trench width; the fourth shallow-etch trench width is greater than the third shallow-etch trench width; the third shallow-etch trench width is greater than the second shallow-etch trench width; and the second shallow-etch trench width is greater than the first shallow-etch trench width. Further, the sixth full-etch trench width is greater than the fifth full-etch trench width; the fifth full-etch trench width is greater than the fourth full-etch trench width; the fourth full-etch trench width is greater than the third full-etch trench width; the third full-etch trench width is greater than the second full-etch trench width; and the second full-etch trench width is greater than the first full-etch trench width. In the illustrated embodiments, full-etch trenches depths, shallow-etch trench depths, and pillar heights of the 6 gratings 204 (i.e., 204-A, 204-B, 204-C, 204-D, 204-E, and 204-F) are constant. It should be noted that this is just an example and is not intended to be limiting. Any combination of gratings with different geometrical dimensions (i.e., depth and width) in any order can be used in combination with material properties and wavelength ranges for achieving desired performances (e.g., center wavelength, coupling efficiency, bandwidth, etc.), which are within the scope of this invention.

Figure 9:
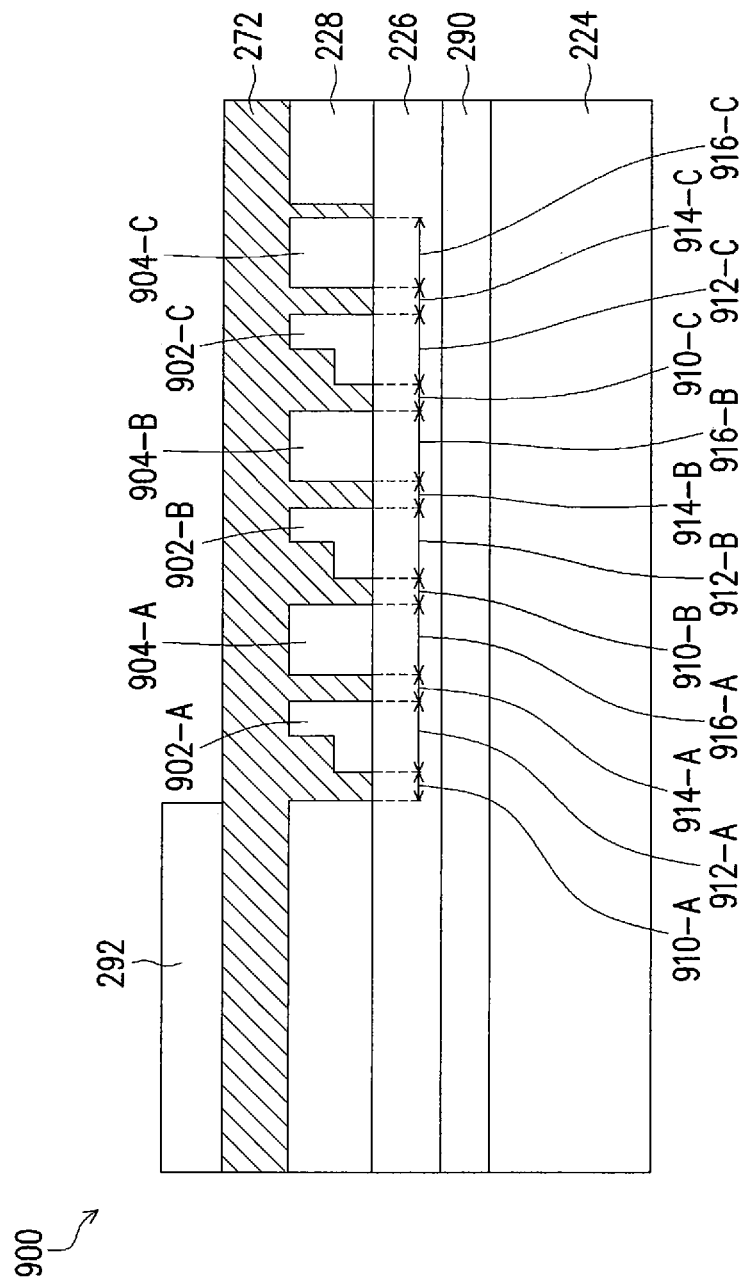
FIG. 9 illustrates a cross-sectional view of an exemplary fiber-to-chip grating coupler along the radius direction, in accordance with some embodiments of the present disclosure.

FIG. 9 illustrates a cross-sectional view of an exemplary fiber-to-chip grating coupler 900 along the radius direction, in accordance with some embodiments of the present disclosure. This is, of course, merely an example and is not intended to be limiting. Any numbers of gratings 204 in a grating coupler 900 can be used and are within the scope of this invention. In the illustrated embodiments, there are 3 L-shaped gratings 902 (i.e., 902-A, 902-B and 902-C) with two etch-steps as discussed in detail in FIG. 2B and there are 3 rectangular gratings 804 (i.e., 904-A, 904-B and 904-C). In some embodiments, the 3 rectangular gratings 904 comprises a full-etch trench 906 and a pillar 908. Each of the full-etch trench 906 has a full-etch trench width 914 and each of the pillar 908 has a pillar width 916. In some embodiments, the full-etch trench width 914 equals to a full-etch trench width 910 of the L-shaped grating 902 and the pillar width 916 equals to a pillar width 912 of the L-shaped grating 902. It should be noted that this is just an example and is not intended to be limiting. Any combination of gratings with different shapes and geometrical dimensions can be used to tune the coupling performance (e.g., center wavelength, bandwidth, coupling efficiency, etc.) and are within the scope of this invention.

FIG. 10 illustrates a cross-sectional view of an exemplary fiber-to-chip grating coupler 1000 along the B-B' direction in FIG. 2A, in accordance with some embodiments of the present disclosure. In the illustrated embodiments, an L-shaped grating 204 comprises 2 etch steps (i.e., a first step 1002 and a second step 1004) and each of the two steps have a step height 234 and 236, respectively. In some embodiments, a thickness 232 of the silicon layer 228 equals to the summation of the step heights 234 and 236. In some embodiments, the thickness 232 of the silicon layer 228 is 270 nanometers. In the illustrated embodiments, the first step 1002 with a step height 234 is not continuous in the B-B' direction and comprises 2 slabs 1002-A/1002-B. A first slab 1002-A of the first step 1002 has a first length 1020 and a second slab 9102-B of the first step 1002 has a second length 1022. Similarly, the second step 1004 with a step height 236 is not continuous in the B-B' direction and comprises 2 slabs 1004-A/1004-B. A first slab 1004-B of the second step 1004 has a third length 1024 and a second slab 1004-B of the second step 904 has a fourth length 1026. In the illustrated embodiment, the first length 1020, the second length 1022, the third length 1024 and the fourth length 1026 are different. In the illustrated embodiments, the two slabs in the first and the second step are separated by corresponding gaps 1006 and 1008. In some embodiments, these 4 lengths 1020/1022/1024/1026 can have the same length. It should be noted that this is merely an example and is not intended to be limiting. Each of the 2 steps may comprise any numbers of slabs at any positions on a grating and the plurality of slabs in a grating can comprise different lengths, which are within the scope of this invention.

Figure 11:
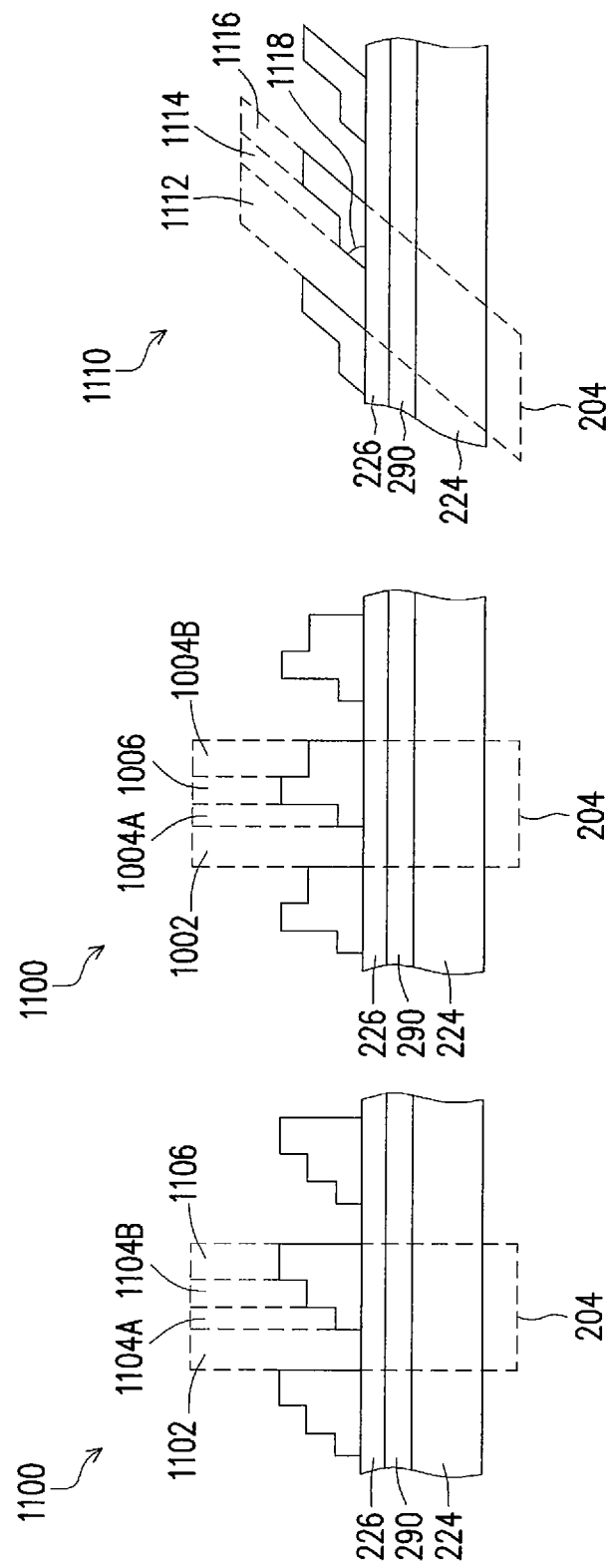
FIG. 11A illustrates a cross-sectional view of a portion of an exemplary grating in a fiber-to-chip grating coupler along the B-B' direction as shown in FIG. 2A, in accordance with some embodiments of the present disclosure.
FIG. 11B illustrates a cross-sectional view of a portion of an exemplary grating in a fiber-to-chip grating coupler along the B-B' direction as shown in FIG. 2A, in accordance with some embodiments of the present disclosure.
FIG. 11C illustrates a cross-sectional view of a portion of an exemplary grating in a fiber-to-chip grating coupler along the B-B' direction as shown in FIG. 2A, in accordance with some embodiments of the present disclosure.

FIG. 11A illustrates a cross-sectional view of a portion of an exemplary grating 204 in a fiber-to-chip grating coupler 1100 along the B-B' direction as shown in FIG. 2A, in accordance with some embodiments of the present disclosure. In the illustrated embodiment, each of the gratings comprises 3 steps including a full-etch trench 1102, 2 shallow-etch trenches 1104 (i.e., 1104-A and 1104-B), and a pillar 1106. In the illustrated embodiments, the shallow-etch trench 1104-A has a greater depth than that of the shallow-etch trench 1104-B. Further, the two shallow-etch trenches 1104-A and 1104-B are positioned between the full-etch trench 1102 and the pillar 1106. It should be noted that this is merely an example and is not intended to be limiting. Any numbers of steps with dimensions (i.e., width and height) can be used according to materials properties and desired operational wavelengths and are within the scope of this invention.

FIG. 11B illustrates a cross-sectional view of a portion of an exemplary grating 204 in a fiber-to-chip grating coupler 1100 along the B-B' direction as shown in FIG. 2A, in accordance with some embodiments of the present disclosure. In the illustrated embodiment, each of the gratings 204 comprises a full-etch trench 1102, 2 shallow-etch trenches 1104-A and 1104-B, and a pillar 1106. In the illustrated embodiment, the shallow-etch trench 1104-A has a greater depth than that of the shallow-etch trench 1104-B. Further, the pillar 1106 is positioned between the two shallow-etch trenches 1104-A/1104-B. It should be noted that this is merely an example and is not intended to be limiting. Any numbers of steps with dimensions (i.e., width and height) can be used according to materials properties and desired operational wavelengths and are within the scope of this invention. Further, any combination order of trenches and pillars with different geometrical dimensions are within the scope of this invention.

FIG. 11C illustrates a cross-sectional view of a portion of an exemplary grating 204 in a fiber-to-chip grating coupler 1110 along the B-B' direction as shown in FIG. 2A, in accordance with some embodiments of the present disclosure. In the illustrated embodiment, each of the gratings is a 2-step slant grating with a full-etch trench 1112, a shallow-etch trench 1114, and a pillar 1116, wherein the full-etch 1112, the shallow-etch trench 1114, and the pillar 1114 each comprises sidewalls that have a slant angle 1118 with respect to a surface of the silicon oxide layer underneath. It should be noted that this is merely an example and is not intended to be limiting. Any numbers of steps with dimensions (i.e., width, height and slant angle) can be used according to materials properties and desired operational wavelengths and are within the scope of this invention. Further, any combination order of trenches and pillars with different geometrical dimensions are within the scope of this invention.

It should be noted that two or more methods to further tailor the coupling performance used in the exemplary grating structures shown in FIGS. 2, and 5-11 can be combined. For example, a fiber-to-chip grating coupler comprises a plurality of gratings and the plurality of gratings may comprise different geometric dimensions and/or numbers of steps are configured with a sub-period. For another example, a fiber-to-chip grating coupler may comprise a plurality of multilayered gratings, wherein each of the plurality of multilayered gratings comprises a plurality of steps, wherein each of the plurality of steps comprises different materials. For another example, a fiber-to-chip grating coupler may comprise a plurality of gratings and each of the plurality of gratings comprises a plurality of slabs, wherein the each of the plurality of slabs has a length that equals to the period of the grating. For another example, a fiber-to-chip grating coupler may comprise a plurality of slant gratings with a plurality of steps, wherein the plurality of slat gratings is filled with a plurality of cladding layers.

Figure 12:
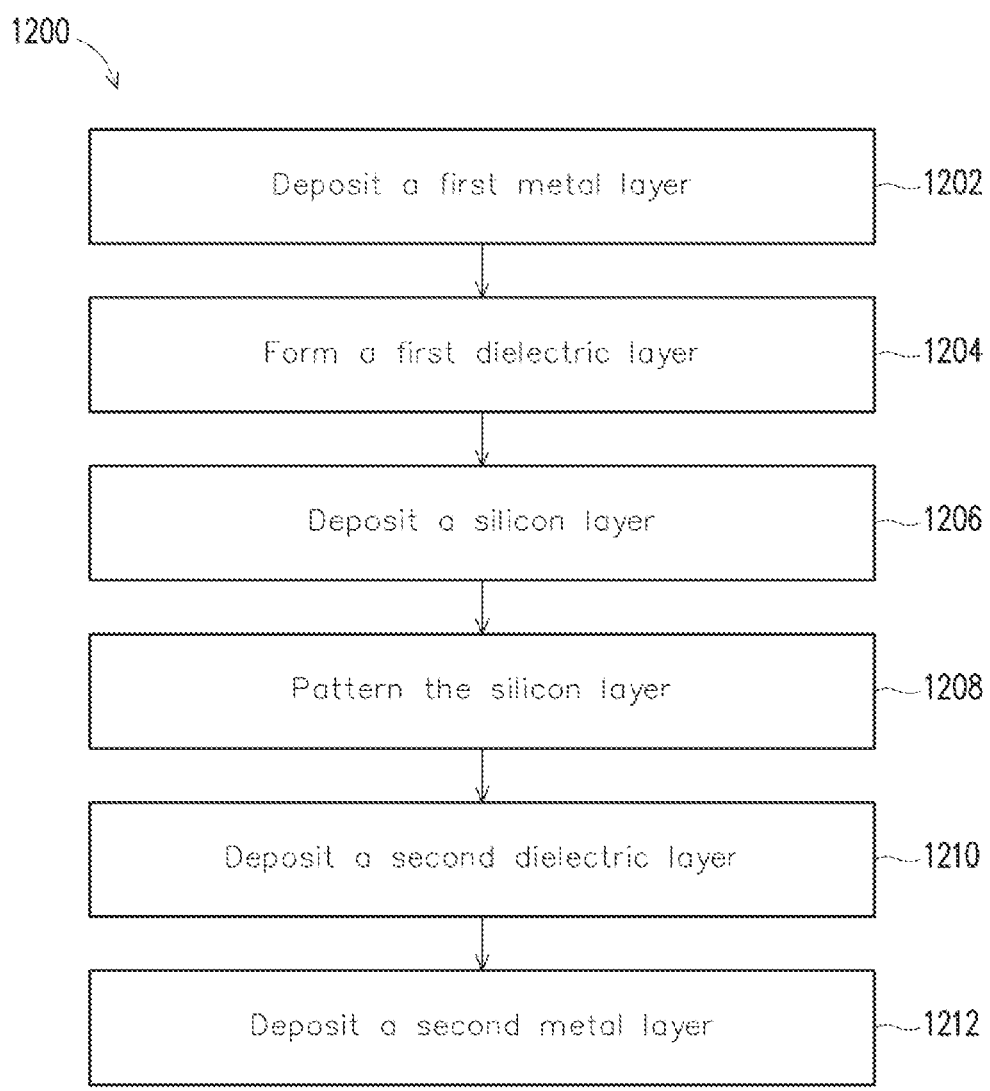
FIG. 12 illustrates a flowchart of a method to form a grating coupler, in accordance with some embodiments of the present disclosure.

FIG. 12 illustrates a flowchart of a method 1200 to form a grating coupler 200, in accordance with some embodiments of the present disclosure. It is noted that the method 1200 is merely an example, and is not intended to limit the present disclosure. Accordingly, it is understood that additional operations may be provided before, during, and after the method 1200 of FIG. 12, and that some other operations may only be briefly described herein. In some embodiments, operations of the method 1200 may be associated with cross-sectional views of a semiconductor device at various fabrication stages as shown in FIGS. 13A-13F, respectively, which will be discussed in further detail below.

Referring now to FIG. 12, the method 1200 starts with operation 1202 in which a first metal layer 290 is deposited on a semiconductor substrate 224 according to some embodiments. In some embodiments, the first metal layer 290 serves as a bottom reflection layer 290 to reflect transmitted light from the grating back to the grating. In some embodiments, the semiconductor substrate 224 is a silicon substrate. Alternatively, the semiconductor substrate 224 may include other elementary semiconductor material such as, for example, germanium. The semiconductor substrate 224 may also include a compound semiconductor such as silicon carbide, gallium arsenic, indium arsenide, and indium phosphide. The semiconductor substrate 224 may include an alloy semiconductor such as silicon germanium, silicon germanium carbide, gallium arsenic phosphide, and gallium indium phosphide. In some embodiments, the first metal layer 290 comprises at least one of the following: Al, Cu, Ni, and a combination. In some embodiments, the first metal layer 290 has a thickness in a range of 0.1-10 micrometers. In some embodiments, the first metal layer 290 is formed on the semiconductor substrate 224 using one of the follow techniques: chemical vapor deposition (CVD), physical vapor deposition (PVD), evaporation, etc. In some embodiments, the semiconductor substrate 224 is first cleaned using an RCA cleaning process.

The method 1200 continues with operation 1204 in which a first dielectric layer 226 is deposited on the first metal layer 290 on a semiconductor substrate 224. In some embodiments, processes to deposit a silicon oxide layer 226 on the first metal layer 290 on the semiconductor substrate 224 includes thermal oxidation, spin coating, physical vapor deposition, chemical vapor deposition, etc. In some other embodiments, the silicon oxide layer 226 can be formed by a process such as separation by implanted oxygen (SIMOX) or other suitable technique, such as wafer bonding and grinding. In some other embodiments, the dielectric layer 226 can be various dielectric materials, including aluminum oxide ($Al_2O_3$), hafnium oxide ($HfO_2$), Lanthanum oxide ($La_2O_3$), zirconium oxide ($ZrO_3$), beryllium strontium titanium oxide (Ba—Sr—Ti—O), silicon nitride ($Si_3N_4$), and laminate of a mixture thereof, according to the application. In some embodiments, the silicon oxide layer 226 has a thickness of 500-3000 nanometers.

The method 1200 continues to operation 1206 in which a silicon layer 228 is formed on the first dielectric layer 226 according to some embodiments. In some embodiments, the silicon layer 228 comprises polycrystalline silicon. In some embodiments, the doped-polycrystalline silicon can be deposited using a chemical vapor deposition (CVD) process. In some embodiments, the silicon layer 228 has a thickness of 270 nanometers. In some other embodiments, the silicon layer 228 has a thickness in a range of 250-350 nanometers according to the application.

The method 1200 continues with operation 1208 in which the silicon layer 228 is patterned to create a plurality of gratings 204, according to some embodiments. In the illustrated embodiments, the plurality of gratings 204 each comprising a two-etch-step L-shaped sidewall profile is used to achieve a low back-reflection and a high directionality. In some embodiments, side walls of each steps are perpendicular to the substrate surface (i.e., top surface of the silicon oxide layer 226). In the illustrate embodiment, each of the plurality of gratings 204 comprises a full-etch trench 246, a shallow-etch trench 248, and a pillar 250 in the silicon layer 228. In some embodiments, the full-etch trench 246 has a trench width of 240 and a trench depth 238. In some embodiments, the trench depth 238 of the full etch trench 246 equals to the thickness 232 of the silicon layer 228. In some embodiments, the trench width 240 and depth 238 equal to 50 nanometers and 270 nanometers. In some other embodiments, the trench width 240 of the full etch trench 246 is in the range of 70-270 nanometers according to the application with different operational wavelengths. In some embodiments, the shallow etch trench 248 has a trench width 242 and a trench depth 236. In some embodiments, the trench depth 236 and the trench width 242 equal to 130 nanometers and 230 nanometers. In some other embodiments, the trench depth 236 and the trench width 242 of the shallow trench 248 are in a range of 70-270 nanometers and 100-200 nanometer, according to the application with different operational wavelengths. In some embodiments, the pillar 250 has a pillar height 238 and a pillar width 244. In some embodiments, the pillar height 238 and the pillar width 244 both equal to 270 nanometers. In some other embodiments, the pillar height 238 and the pillar width 244 of the pillar 250 are in a range of 180-400 nanometers and 170-370 nanometers. In the illustrated embodiments, the shallow-etch trench 248 is located between the full-etch trench 246 and the pillar 250 in one period 212. In some embodiments, a grating region 202 has a length of 206 and a waveguide 210 has a length of 212 in the radius direction.

The method 1200 continues with operation 1210 in which a second dielectric layer 272 is deposited on to top of the patterned silicon layer 228, according to some embodiments. In some embodiments, the second dielectric layer 272 is a cladding layer. In some embodiments, the second dielectric layer 272 comprises silicon oxide and has a thickness of 274 from its top surface to the top surface of the underneath unpatterned silicon layer 228. In some embodiments, the second dielectric layer 272 has a thickness of 2 micrometers. In some embodiments, the thickness 274 of the second dielectric layer 272 can be in a range of 0.6-3 micrometers according to the application. In some embodiments, the second dielectric layer 272 can comprise other types of dielectric materials according to different applications, including polycrystalline silicon and silicon nitride. In some other embodiments, the second dielectric layer 272 comprises a plurality of layers with graded indices (i.e., the refractive index of the layers in the second dielectric layer 272 increases). In some embodiments, the thickness of the plurality of layers can be individually adjusted according to the application. It should be noted that this is merely an example and optimized thickness of the second dielectric layer 272 is a function of its effective index (i.e., material properties) in combination with the grading structure underneath. Therefore, any thickness of the second dielectric layer 272 can be used to achieve optimized coupling efficiency at desired wavelengths and are within the scope of the present disclosure.

In some embodiments, the second dielectric layer 272 is further polished to create a flat surface. In some embodiments, the second dielectric layer 272 is polished using a chemical-mechanical polishing (CMP) process.

The method 1200 continues with operation 1212 in which a second metal layer 292 is formed on the polished surface of the second dielectric layer 272, according to some embodiments. In some embodiments, the second metal layer 292 is a top reflection layer. In some embodiments, the second metal layer 292 comprises at least one of the following: Al, Cu, Ni and a combination. In some embodiments, the second metal layer 292 has a thickness in a range of 0.1-10 micrometers. In some embodiments, the second metal layer 292 only covers the waveguide 210. In some embodiments, the second metal layer 292 is equal to or greater than 20×20 micron. In some embodiments, the second metal layer 292 is deposited using one of the following techniques, PVD, and CVD. In some embodiments, the second metal layer 292 is further patterned using one or more patterning processes (e.g., a lithography process, a dry/wet etching process, a soft/hard baking process, a cleaning process, etc.) to form the top reflection layer at the designated locations relative to the plurality of gratings 204.

As mentioned above, FIGS. 13A-13F illustrate, in a cross-sectional view, a portion of a grating coupler 1300 with a plurality of periodic gratings 204 and a waveguide 210 of FIG. 1. FIGS. 13A-13F are simplified for a better understanding of the concepts of the present disclosure. Although the figures illustrate the grating coupler 1300, it is understood the grating coupler 1300 may comprise a number of other devices, which are not shown in FIGS. 13A-13F, for purposes of clarity of illustration.

Figure 13A:
FIGS. 13A-13F illustrate cross-sectional view of the grating coupler at various stages of a fabrication process, in accordance with some embodiments of the present disclosure.

FIG. 13A is a cross-sectional view of the grating coupler 1300 including a semiconductor substrate 224, in accordance with some embodiments of the present disclosure. In some embodiments, the semiconductor substrate 224 includes a silicon substrate. Alternatively, the semiconductor substrate 224 may include other elementary semiconductor material such as, for example, germanium. The semiconductor substrate 224 may also include a compound semiconductor such as silicon carbide, gallium arsenic, indium arsenide, and indium phosphide. The semiconductor substrate 224 may include an alloy semiconductor such as silicon germanium, silicon germanium carbide, gallium arsenic phosphide, and gallium indium phosphide.

Figure 13B:

FIG. 13B is a cross-sectional view of the grating coupler 1300 including a deposition of a first metal layer 290, a first dielectric layer 226 and a silicon layer 228, in accordance with some embodiments of the present disclosure. In some embodiments, the first metal layer 290 comprises at least one of the following: Al, Cu, Ni, and a combination. In some embodiments, the first metal layer 290 has a thickness in a range of 0.1-10 micrometers.

In some embodiments, processes to deposit a silicon oxide layer 226 on the first metal layer 290 on the semiconductor substrate 224 includes thermal oxidation, spin coating, physical vapor deposition, chemical vapor deposition, etc. In some other embodiments, the silicon oxide layer 226 can be formed by a process such as separation by implanted oxygen (SIMOX) or other suitable technique, such as wafer bonding and grinding. In some other embodiments, the dielectric layer 226 can be various dielectric materials, including aluminum oxide ($Al_2O_3$), hafnium oxide ($HfO_2$), Lanthanum oxide ($La_2O_3$), zirconium oxide ($ZrO_3$), beryllium strontium titanium oxide (Ba—Sr—Ti—O), silicon nitride ($Si_3N_4$), and laminate of a mixture thereof, according to the application. In some embodiments, the silicon oxide layer 226 has a thickness of 500-3000 nanometers.

In some embodiments, the silicon layer 228 comprises polycrystalline silicon. In some embodiments, the doped-polycrystalline silicon can be deposited using a chemical vapor deposition (CVD) process. In some embodiments, the silicon layer 228 has a thickness of 270 nanometers. In some other embodiments, the silicon layer 228 has a thickness in a range of 250-350 nanometers according to the application.

Figure 13C:
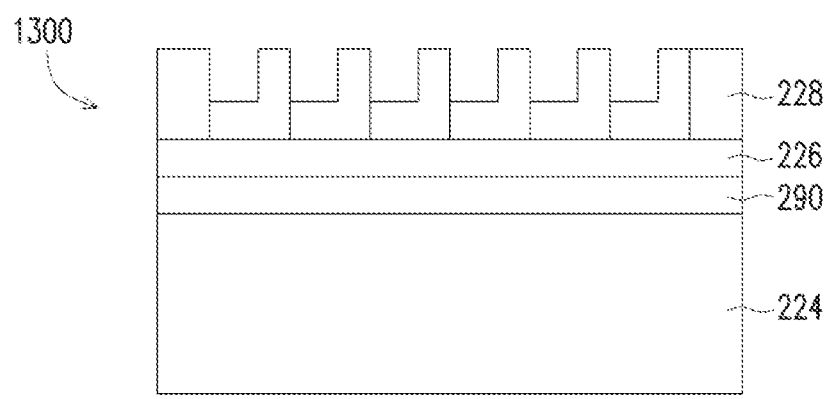

FIG. 13C is a cross-sectional view of the grating coupler 1300 including a patterning of the silicon layer 228 using a first photoresist layer (not shown) at one of the various stages of fabrication that corresponds to operation 1208 of FIG. 12, in accordance with some embodiments of the present disclosure. In some embodiments, the first photoresist layer may include a negative or positive tone photoresist layer that is patternable in response to a photolithography light source. In some alternative embodiments, the first photoresist layer may include an e-beam (electron beam) resist layer (e.g., poly methyl methacrylate, methyl methacrylate, etc.) that is patternable in response to an e-beam lithography energy source. In some embodiments, the first photoresist layer is formed over the silicon layer 228 using a deposition process known in the art such as spin-coating, spray-coating, dip-coating, roller-coating, or the like. The first photoresist layer is then patterned in a lithography process that may involve various exposure, developing, baking, stripping, etching, and rinsing processes. As a result, openings in the first patterned photoresist layer is formed such that at least a portion of the top surface of the silicon layer 228 is exposed.

The exposed silicon layer 228 at the openings is etched using the first photoresist layer as a mask, in certain embodiments. In some embodiments, the silicon layer 228 exposed at the openings of the first photoresist layer is etched using a dry etching process, e.g., a plasma enhanced deep reactive ion etching (DRIE) based on a proper chemistry according to the material of the silicon layer 228. In some embodiments, after etching the silicon layer 228, the first photoresist layer may be removed by one or more chemical cleaning processes using acetone, 1-Methyl-2-pyrrolidon (NMP), Dimethyl sulfoxide (DMSO), or other suitable removing chemicals. In some embodiments, the chemicals used may need to be heated to temperatures higher than room temperature to effectively dissolve the first patterned photoresist layer. The selection of the remover is determined by the type and chemical structure of the first photoresist layer, the silicon layer 228, as well as the first dielectric layer 226, the first metal layer 290, and the substrate 224 to assure the chemical compatibility of these layers with the chemical cleaning process. In some embodiments, this cleaning process is then followed by a rinsing process using isopropyl alcohol or the like, followed by rinsing using deionized water.

Figure 13D:
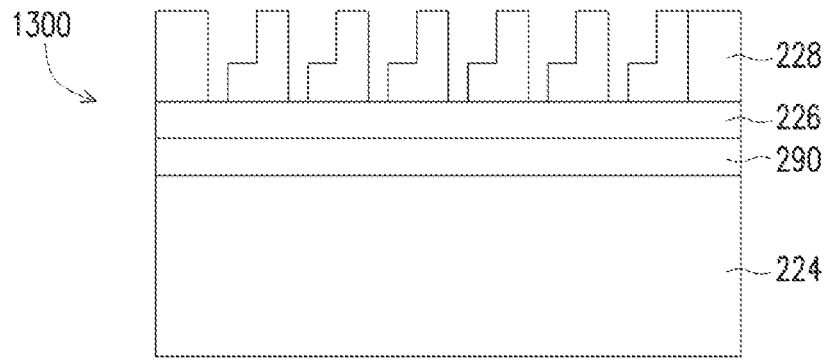

FIG. 13D is a cross-sectional view of the grating coupler 1300 including a patterning of the silicon layer 228 on the substrate 224 using a second photoresist layer (not shown) at one of the various stages of fabrication that corresponds to operation 1208 of FIG. 12, in accordance with some embodiments of the present disclosure. In some embodiments, the etched silicon layer 228 is further etched to create a step ("L"-shape) profile.

Figure 13E:
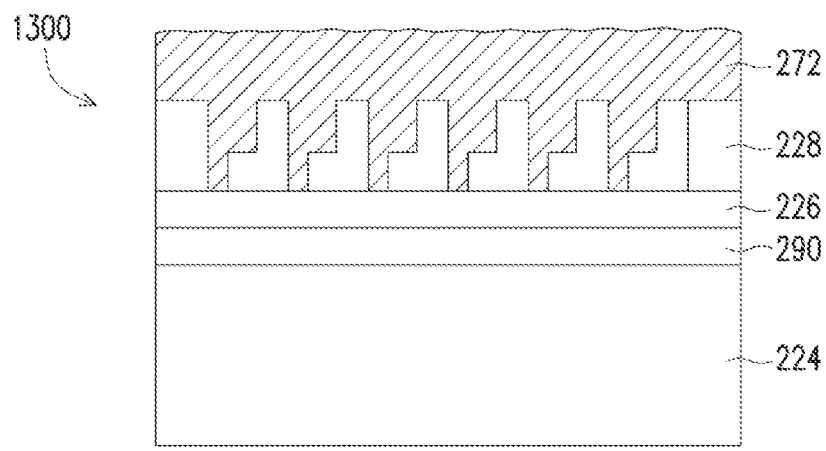

FIG. 13E is a cross-sectional view of the grating coupler 1300 including filling the etched silicon layer 228 with a second dielectric layer 272 at one of the various states of fabrication that corresponds to operation 1210 of FIG. 12, in accordance with some embodiments of the present disclosure. In some embodiments, the second dielectric layer 272 includes a material that is at least one of the following materials, including silicon oxide, a low dielectric constant (low-k) material, other suitable dielectric material, or a combination thereof. The low-k material may include fluorinated silica glass (FSG), phosphosilicate glass (PSG), borophosphosilicate glass (BPSG), carbon doped silicon oxide ($SiO_xC_y$), Black Diamond® (Applied Materials of Santa Clara, Calif.), Xerogel, Aerogel, amorphous fluorinated carbon, Parylene, BCB (bis-benzocyclobutenes), SiLK (Dow Chemical, Midland, Mich.), polyimide, and/or other future developed low-k dielectric materials.

The second dielectric layer 272 can be formed by various processes including deposition of the second dielectric layer using PVD, CVD and the like. The thickness of the second dielectric layer 272 is controlled by the desired effective refractive index, which is a function of the dielectric constant of the second dielectric layer 272 and silicon layer 228, and dimensions of the gratings 204.

Figure 13F:
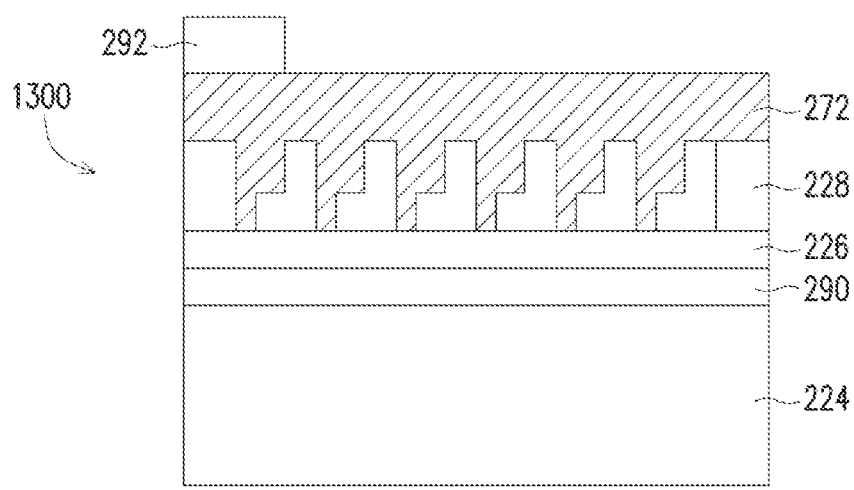

FIG. 13F is a cross-sectional view of the grating coupler 1300 including polishing the second dielectric layer 272, depositing and patterning a second metal layer 292 at one of the various states of fabrication that corresponds to operations 1210-1212 of FIG. 12, in accordance with some embodiments of the present disclosure. In some embodiments, the second dielectric layer 272 is polished using a chemical-mechanical planarization (CMP) process, which is a typical planarization process. CMP utilizes a chemical slurry formulation and mechanical polishing process to remove unwanted conductive or dielectric materials on the substrate, in order to achieve a near-perfect flat and smooth surface. Because of the nature of this cleaning process, a variety of contaminants (e.g., trace metals, mobile ions and organic species) and abrasive materials (e.g., silica and alumina) from the slurry can be introduced to the substrate surface. Furthermore, the grating coupler 1300 with filled trenches in the silicon layer 228 is cleaned to remove contaminants and materials from substrate after CMP, and reduce slurry residues to the required minimum level in order to potentially maximize device yields. In some embodiments, the top surface of the second dielectric layer 272 is coplanar as shown in FIG. 13F.

In some embodiments, the patterning of the second metal layer 292 is performed using a third photolithograph process. Accordingly, in some embodiments, a patterned photoresist layer is formed after a conventional patterning (e.g., photolithography) processes, to align with at least part of the grating region so as to allow the second reflection patterns to couple with the gratings for improved coupling efficiency.

In one embodiment, a method for communication, includes: transmitting optical signals between a semiconductor photonic die on a substrate and an optical fiber array attached to the substrate using at least one corresponding grating coupler on the semiconductor photonic die, wherein the at least one grating coupler each comprises a plurality of coupling gratings, a waveguide, a cladding layer, a first reflection layer and a second reflection layer, wherein the plurality of coupling gratings each comprises at least one step in a first lateral direction and extends in a second lateral direction, wherein the first and second lateral directions are parallel to a surface of the substrate and perpendicular to each other in a grating plane, wherein the first reflection layers are configured such that the plurality of coupling gratings is disposed between the first reflection layer and the cladding layer, wherein the second reflection layer are configured such that the cladding layer is disposed between the second reflection layer and the waveguide.

In another embodiment, a system for communication, includes: a semiconductor photonic die comprising: at least one grating coupler on the semiconductor photonic die to transmit optical signals between the semiconductor photonic die on a substrate and an optical fiber array attached to the substrate, wherein the at least one grating coupler each comprises a plurality of coupling gratings, a waveguide, a cladding layer, a first reflection layer and a second reflection layer, wherein the plurality of coupling gratings each comprises at least one step in a first lateral direction and extends in a second lateral direction, wherein the first and second lateral directions are parallel to a surface of the substrate and perpendicular to each other in a grating plane, wherein the first reflection layers are configured such that the plurality of coupling gratings is disposed between the first reflection layer and the cladding layer, wherein the second reflection layer are configured such that the cladding layer is disposed between the second reflection layer and the waveguide.

Yet, in another embodiment, an apparatus for optical coupling, includes: a plurality of coupling gratings, wherein the plurality of coupling gratings each comprises at least one step in a first lateral direction and extends in a second lateral direction, wherein the first and second lateral directions are parallel to a surface of the substrate and perpendicular to each other in a grating plane; a waveguide, the waveguide comprises a first optical medium with a first thickness; a cladding layer, wherein the cladding layer comprises a second optical medium and a first continuous planar surface; a first reflection layer, wherein the first reflection layers are configured such that the plurality of coupling gratings is disposed between the first reflection layer and the cladding layer; and a second reflection layer, wherein the second reflection layer are configured such that the cladding layer is disposed between the second reflection layer and the waveguide.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus for optical coupling, comprising:
   a semiconductor substrate;
   a first metal layer formed on the semiconductor substrate;
   a first dielectric layer formed on the first metal layer;
   a silicon layer formed on the first dielectric layer;
   a plurality of coupling gratings formed by patterning the silicon layer, wherein the plurality of coupling gratings each comprises at least one step in a first lateral direction and extends in a second lateral direction, wherein the first and second lateral directions are parallel to a surface of the semiconductor substrate and perpendicular to each other in a grating plane;
   a waveguide, the waveguide comprises a first optical medium with a first thickness;
   a cladding layer, wherein the cladding layer comprises a second optical medium and a first continuous planar surface;
   a first reflection layer, wherein the first reflection layer is configured such that the plurality of coupling gratings is disposed between the first reflection layer and the cladding layer; and
   a second reflection layer, wherein the second reflection layer is configured such that the cladding layer is disposed between the second reflection layer and the waveguide.

2. The apparatus of claim 1, wherein the first optical medium is silicon and the first thickness is in a range of 250-350 nanometers.

3. The apparatus of claim 2, wherein each of the plurality of coupling gratings comprises a first trench, a pillar and a second trench disposed between the first trench and the pillar, wherein a first pillar of a first coupling grating of the plurality of coupling gratings has a first width and a second pillar of a second coupling grating of the plurality of coupling gratings has a second width different than the first width, and wherein a first depth of the first trench is in a range of 250-350 nanometer, wherein a second depth of the second trench is smaller than the first thickness, and wherein a height of the pillar is equal to the first depth of the first trench.

4. A system for communication, comprising:
   a semiconductor substrate;
   a first metal layer formed on the semiconductor substrate;
   a first dielectric layer formed on the first metal layer;
   a silicon layer formed on the first dielectric layer;
   a plurality of coupling gratings formed by patterning the silicon layer, wherein the plurality of coupling gratings each comprises at least one step in a first lateral direction and extends in a second lateral direction, wherein the first and second lateral directions are parallel to a surface of the substrate and perpendicular to each other in a grating plane, wherein each of the plurality of coupling gratings comprises a first trench, a pillar and a second trench disposed between the first trench and the pillar, wherein a first pillar of a first coupling grating of the plurality of coupling gratings has a first width and a second pillar of a second coupling grating of the plurality of coupling gratings has a second width different than the first width;
   a waveguide, the waveguide comprises a first optical medium with a first thickness;
   a cladding layer, wherein the cladding layer comprises a second optical medium and a first continuous planar surface;
   a first reflection layer, wherein the first reflection layer is configured such that the plurality of coupling gratings is disposed between the first reflection layer and the cladding layer; and
   a second reflection layer, wherein the second reflection layer is configured such that the cladding layer is disposed between the second reflection layer and the waveguide.

5. The system of claim 4, wherein the semiconductor substrate comprises at least one of: silicon, germanium, silicon carbide, gallium arsenic, indium arsenide and indium phosphide.

6. The system of claim 4, wherein the first metal layer comprises at least one of: aluminum, copper and nickel.

7. The system of claim 4, wherein the first metal layer has thickness in the range of 0.1 to 10 micrometers.

8. The system of claim 4, wherein the first dielectric layer comprises at least one of: silicon oxide, aluminum oxide, hafnium oxide, lanthanum oxide, zirconium oxide, beryllium strontium titanium oxide and silicon nitride.

9. The system of claim 4, wherein the second metal layer comprises at least one of: aluminum, copper and nickel.

10. The system of claim 9, wherein the second metal layer has thickness in the range of 0.1 to 10 micrometers.

11. The system of claim 4, wherein a first depth of the first trench is in a range of 250-350 nanometers, and a second depth of the second trench is smaller than the first thickness.

12. The system of claim 4, wherein a height of the pillar is equal to the first depth of the first trench.

* * * * *